(12) United States Patent
Viger et al.

(10) Patent No.: US 12,309,842 B2
(45) Date of Patent: May 20, 2025

(54) TEMPORARY AIDS FOR UNASSOCIATED STATIONS IN COMMUNICATION NETWORKS

(71) Applicant: CANON KABUSHIKI KAISHA, Tokyo (JP)

(72) Inventors: Pascal Viger, Janze (FR); Stéphane Baron, Le Rheu (FR); Patrice Nezou, Liffre (FR)

(73) Assignee: Canon Kabushiki Kaisha, Tokyo (JP)

( * ) Notice: Subject to any disclaimer, the term of this patent is extended or adjusted under 35 U.S.C. 154(b) by 673 days.

(21) Appl. No.: 17/623,744

(22) PCT Filed: Jul. 3, 2020

(86) PCT No.: PCT/EP2020/068827
§ 371 (c)(1),
(2) Date: Dec. 29, 2021

(87) PCT Pub. No.: WO2021/001535
PCT Pub. Date: Jan. 7, 2021

(65) Prior Publication Data
US 2022/0264652 A1    Aug. 18, 2022

(30) Foreign Application Priority Data
Jul. 4, 2019  (GB) ..................................... 1909637

(51) Int. Cl.
*H04W 74/08* (2024.01)
*H04L 5/00* (2006.01)
*H04W 74/0833* (2024.01)

(52) U.S. Cl.
CPC ....... *H04W 74/0833* (2013.01); *H04L 5/0055* (2013.01)

(58) Field of Classification Search
CPC . H04W 74/0833; H04W 84/12; H04W 74/02; H04W 74/006; H04L 5/0055
See application file for complete search history.

(56) References Cited

U.S. PATENT DOCUMENTS

| | | | |
|---|---|---|---|
| 10,641,887 B1* | 5/2020 | Chu ....................... | G01S 13/765 |
| 11,778,663 B1* | 10/2023 | Jiang ................. | H04W 72/1268 370/445 |
| 2017/0310448 A1* | 10/2017 | Kim .......................... | H04L 1/00 |
| 2018/0077735 A1* | 3/2018 | Ahn .................. | H04W 72/1268 |

(Continued)

*Primary Examiner* — Hoang-Chuong Q Vu
(74) *Attorney, Agent, or Firm* — Canon U.S.A., Inc. IP Division

(57) ABSTRACT

Association procedure in 802.11 networks is bandwidth consuming because the management frames are sent in the low bitrate Single User mode. Multi-user operations are not available for unassociated stations because they are not assigned association identifiers. The present invention proposes to provide temporary AIDs to unassociated stations sending a frame to the AP, wherein the temporary AIDs are conveyed by a multi-station block acknowledgment. In an efficient scenario for station association, unassociated stations randomly access tone sets of a short feedback procedure. Based on the feedback responses, the AP subsequently provides MU UL RUs for the unassociated station to send a first management frame. Subsequently, the temporary AID may be used to schedule further MU UL RUs and to provide response in MU DL transmissions.

24 Claims, 12 Drawing Sheets

(56) References Cited

U.S. PATENT DOCUMENTS

| | | | |
|---|---|---|---|
| 2018/0110076 A1* | 4/2018 | Ko | H04W 74/006 |
| 2018/0124858 A1* | 5/2018 | Gan | H04W 72/04 |
| 2018/0167978 A1* | 6/2018 | Ghosh | H04W 74/0833 |
| 2018/0288743 A1 | 10/2018 | Choi et al. | |
| 2018/0302930 A1* | 10/2018 | Wang | H04W 48/18 |
| 2019/0089434 A1 | 3/2019 | Laurent et al. | |
| 2019/0150189 A1* | 5/2019 | Ghosh | H04W 88/10 |
| | | | 370/329 |
| 2019/0349232 A1* | 11/2019 | Cariou | H04B 7/0417 |
| 2019/0373599 A1* | 12/2019 | Ghosh | H04W 48/14 |
| 2020/0092881 A1* | 3/2020 | Nezou | H04W 74/0816 |
| 2020/0305103 A1* | 9/2020 | Chen | H04W 56/001 |
| 2021/0044389 A1* | 2/2021 | Kim | H04L 5/0055 |
| 2021/0227502 A1* | 7/2021 | Huang | H04L 1/1614 |
| 2021/0409165 A1* | 12/2021 | Wang | H04L 1/1896 |
| 2022/0225323 A1* | 7/2022 | Wang | H04W 72/56 |
| 2022/0330344 A1* | 10/2022 | Lou | H04L 5/0055 |

* cited by examiner

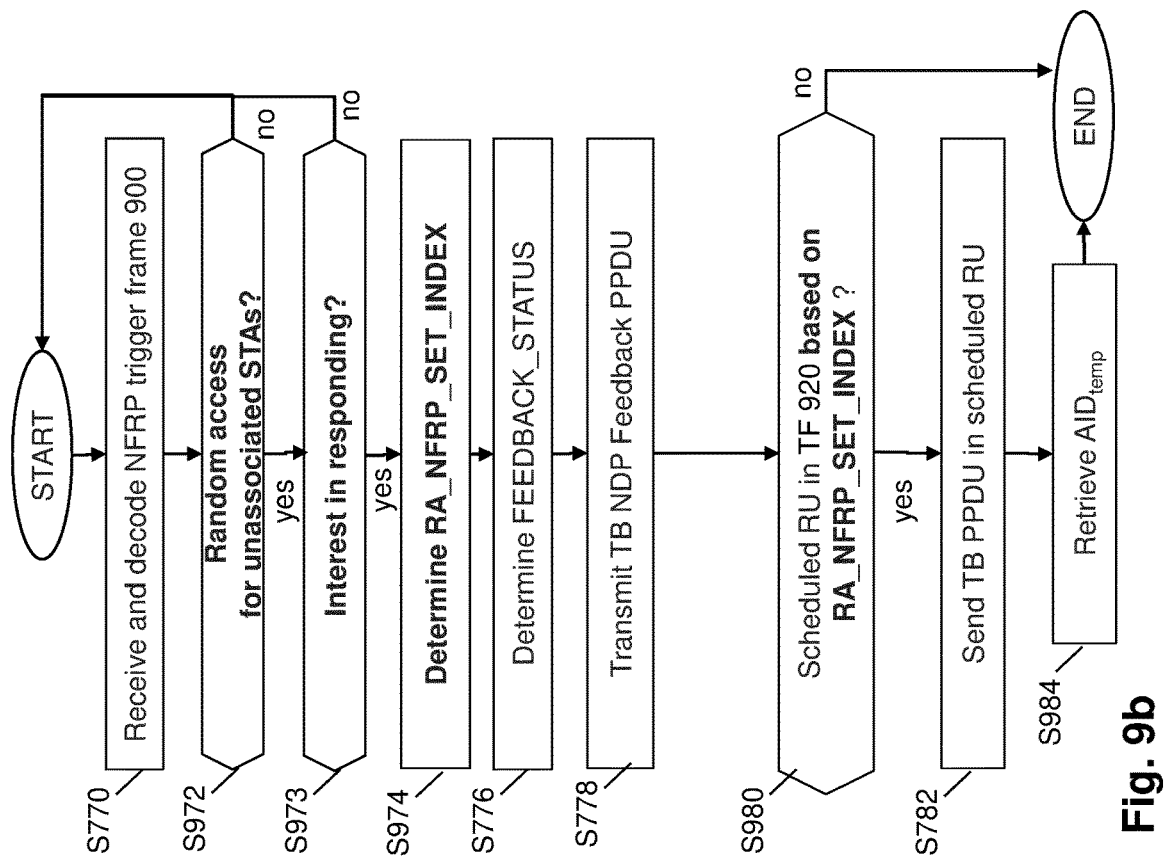
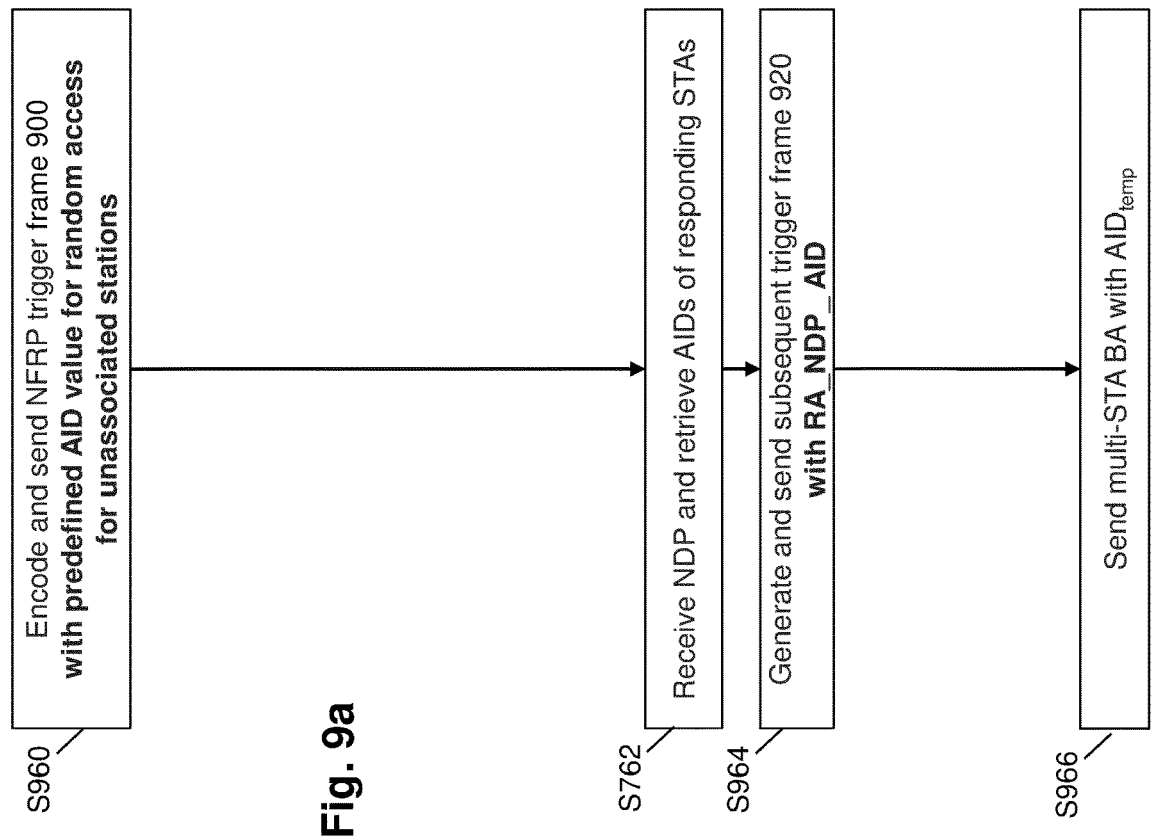
Fig. 9a
Fig. 9b

TEMPORARY AIDS FOR UNASSOCIATED STATIONS IN COMMUNICATION NETWORKS

CROSS REFERENCE TO RELATED APPLICATION

This is a National Stage Application filed under 35 U.S.C. 371 of International Application No. PCT/EP2020/068827 filed on Jul. 3, 2020, which claims the benefit under 35 U.S.C. § 119(a)-(d) of United Kingdom Patent Application No. 1909637.9, filed on Jul. 4, 2019 and entitled "TEMPORARY AIDS FOR UNASSOCIATED STATIONS IN COMMUNICATION NETWORKS". The above-cited patent applications are incorporated herein by reference in their entireties.

FIELD OF THE INVENTION

The present invention relates generally to communication networks and more specifically to wireless communication methods involving unassociated non-AP stations willing to communication, for instance to associate with a wireless network administrated by an access point (AP), and corresponding communication devices.

BACKGROUND OF THE INVENTION

The IEEE 802.11® family of standards provides multi-user (MU) schemes to allow a single access point (AP) to schedule MU transmissions, i.e. multiple simultaneous transmissions to or from non-AP stations or "nodes", in the wireless network. This approach increases bandwidth and decreases latency requirements compared to original 802.11 networks.

MU downlink (DL) transmission is allowed where the AP performs multiple simultaneous elementary transmissions, over so-called resource units (RUs), to various non-AP stations. As an example, the resource units split a communication channel of the wireless network in the frequency domain, based for instance on Orthogonal Frequency Division Multiple Access (OFDMA) technique.

MU uplink (UL) transmissions are also allowed that are triggered by the AP. Various non-AP stations can simultaneously transmit to the AP over the resource units forming the MU UL transmission. To control the MU UL transmission by the non-AP stations, the AP sends a control frame, known as a Trigger Frame (TF), which defines a plurality of resource units for the non-AP stations.

Various variants of trigger frames exist depending on the nature of information the non-AP stations can provide in response. The main variant is the basic trigger frame for the non-AP stations to send any data they wish.

Some RUs may be allocated in a basic trigger frame to specific non-AP stations using 16-bit Association IDentifiers (AIDs) assigned to them upon registration to the AP (so-called scheduled RUs).

Others RUs (known as random RUs) are available to the non-AP stations using a contention-based access scheme. Only three types of trigger frames are known that provide such random access to RUs, namely the Basic Trigger frame, the BQRP Trigger frame and the BSRP Trigger frame. This scheme is known as UL OFDMA-based random access (UORA) scheme.

UORA is useful for wireless networks because it provides opportunities for the non-AP stations to transmit, without the AP having polled them to know their needs for transmission. However, it suffers from various drawbacks.

It suffers from a low maximum efficiency of 37% (successfully used random RUs) to be compared to 37% of unused random RUs and 26% of random RUs with collisions.

The lost random RUs (either unused or collided) occur on large transmission durations (because transmitting non-AP stations have usually substantial amounts of data to transmit during UORA). This substantially decreases network efficiency.

A variant trigger frame to the basic trigger frame is the Null-Data-Packet (NDP) Feedback Report Poll (NFRP) trigger frame implementing the so-called Null-Data-Packet (NDP) Feedback Report procedure. This procedure allows the AP to collect feedback that is not channel sounding from multiple non-AP stations in a more efficient manner than with a basic trigger frame. The AP sends a NFRP Trigger frame to solicit NDP feedback report responses from many non-AP stations that are identified by a range of scheduled AIDs in the NFRP Trigger frame. The NDP feedback report response from a non-AP station is a HE trigger-based (TB) feedback NDP.

The procedure is short compared to the duration of an UL transmission triggered by a basic Trigger frame, mainly because the NDP in response is short. It also has a low and stable latency compared to conventional "Carrier Sense Multiple Access with Collision Avoidance" CSMA-CA mechanisms when used in dense environments.

However, the NDP Feedback Report procedure also suffers from some limitations.

For instance, it can address a limited set of (usually 18 or 36 for a 20 Mhz wide operating band) continuous AIDs which may be punctured (some AIDs may not be assigned to non-AP stations or have been released when non-AP stations leave the AP during the lifetime of the network). The limited continuous set of AIDs is not adapted to the gathering of feedback responses from a high number of non-AP stations, i.e. per BSS basis.

In addition, be it the above short feedback procedure or the MU UL operations, only non-AP stations already associated with the AP (i.e. registered to it) can use the above short feedback procedure and are concerned by the core of the MU operations. This is mainly because the non-associated or unassociated non-AP stations are, for the time being, deprived of any Association Identifier, AID, used for such signalling.

Consequently, these short feedback and MU procedures are not well adapted to the association procedure the unassociated non-AP stations must use to register. The unassociated non-AP stations thus have to go on with association management frame exchanges in the low bitrate and inefficient Single User mode. This is detrimental to wireless network efficiency.

SUMMARY OF INVENTION

The present invention seeks to overcome some of the foregoing concerns.

In this context, the invention provides a communication method in a wireless (usually local area) network managed by an access point, AP, comprising the following steps at an unassociated (non-AP) station:

sending, to the AP, a first frame, and
receiving, from the AP, an acknowledgment frame acknowledging the sent first frame, wherein the acknowledgment frame is a multi-station block acknowledgment frame providing a temporary AID to the unassociated station. The acknowledgment frame may further include a MAC address of the unassociated station for which the temporary AID is intended.

Correspondingly, the invention provides a communication method comprising the following steps at an access point, AP, managing a wireless network:

receiving a first frame from at least one unassociated (non-AP) station, obtaining a temporary association identifier, AID, for the unassociated station, and sending an acknowledgment frame to acknowledge the received first frame to the unassociated station, wherein the acknowledgment frame is a multi-station block acknowledgment frame providing the temporary AID to the unassociated station. The acknowledgment frame may further include a MAC address of the unassociated station for which the temporary AID is intended. The present invention thus provides early delivery of an AID (although temporary) for unassociated non-AP stations with neither additional frame nor modified management frame. It turns that subsequent exchanges between the AP and these unassociated non-AP stations can be substantially facilitated, for instance exchanges for association purposes. Indeed, thanks to the temporary AID, the unassociated non-AP station can be directly targeted in subsequent MU operations for instance to send other messages for the association procedure. This saves substantial network usage, in particular for association purposes where low bitrate (thus inefficient) SU mode can then be avoided.

Correlatively, the invention also provides a communication device, either the AP or an (unassociated non-AP) station, comprising at least one microprocessor configured for carrying out the steps of any of the above methods.

Optional features of embodiments of the invention are defined in the appended claims. Some of these features are explained here below with reference to a method, while they can be transposed into device features.

In some embodiments, the method further comprises, at the unassociated station:

receiving, from the AP, a previous trigger frame reserving a plurality of resource units, RUs, for uplink multi-user, UL MU, transmissions to the AP, selecting a first one of the RUs, and transmitting the first frame on the selected first RU.

Correspondingly, from AP perspective, the method may further comprise, at the AP, sending a previous trigger frame reserving a plurality of resource units, RUs, for uplink multi-user, UL MU, transmissions from stations, wherein the first frame is received on a first RU of the plurality of RUs for UL MU transmissions. Of course, in variants, the first frame may be transmitted by the unassociated non-AP station in a Single User, SU, mode.

A single multi-station block acknowledgement may then acknowledge and send temporary AIDs to all unassociated non-AP stations using the UL MU transmission.

For instance, the first RU may be a random RU for unassociated stations to which the unassociated stations access based on contention. Such RU may be identified in the previous TF using an AID=2045. This allows for instance any unassociated stations to initiate its registration (association procedure) without using the SU mode.

In some embodiments, the method further comprises, at the unassociated station:

receiving, from the AP, a random-access, RA, null data packet, NDP, feedback report poll, NFRP, trigger frame, the RA-NFRP trigger frame reserving a plurality of resource unit, RU, tone sets for NDP feedback report responses by unassociated stations, wherein the RU tone sets are accessed by the unassociated stations on a random basis, randomly selecting a responding RU tone set from the plurality of RU tone sets, and sending a NDP feedback report response on the selected responding RU tone set, wherein the first RU is an RU assigned to the unassociated station based on an index of the selected responding RU tone set.

Correspondingly, from AP perspective, the method may further comprise, at the AP, sending a random-access, RA, null data packet, NDP, feedback report poll, NFRP, trigger frame, the RA-NFRP trigger frame reserving a plurality of RU tone sets for NDP feedback report responses by unassociated stations, wherein the RU tone sets are accessed by the unassociated stations on a random basis, and receiving, from responding unassociated stations, NDP feedback report responses on responding RU tone sets, wherein the first RU (over which the first frame will be received) is assigned, in the previous trigger frame, to a responding unassociated station, for instance using an index of the corresponding responding RU tone set. In other words, the first RU is the RU assigned to the unassociated non-AP station because it has responded to the RA-NFRP trigger frame. An AID associated with the first RU (in the previous trigger frame) may thus be formed using the RU tone set index and optionally an offset to avoid using AIDs conventionally used for registered non-AP stations.

Thanks to this approach, an unassociated non-AP station can quickly initiate its registration to the AP by taking an opportunity (random RU tone set) during any short feedback procedure. Again this avoids using the SU mode.

Furthermore, the AP can obtain at once (i.e. using only one NFRP trigger frame) feedback report responses from a large group of unassociated non-AP stations compared to the known NDP Feedback Report procedure where only scheduled AIDs, and in a limited number, can be polled by the AP.

In some embodiments, an AID associated with the first RU in the previous trigger frame is built from the index of the responding RU tone set and from an offset value. This makes it possible to uniquely identify the responding unassociated non-AP stations while keeping compliance with the 802.11 ax standard where some ranges of AIDs are already used.

In other embodiments, the offset value is transmitted by the AP to the unassociated stations in a management frame, e.g. a beacon frame.

In yet other embodiments, the offset value is 2048 or above and is added to the index of the responding RU tone set to form the AID associated with the first RU. Consequently, the resulting AID is set outside the range of AIDs assigned by the AP to individual non-AP stations upon registration. This advantageously avoids any specific processing dedicated to such AIDs and allows such AIDs to be used simultaneously (e.g. in the same trigger frame) with conventional AIDs.

In some embodiments, the unassociated station sends a NDP feedback report response of a first type to indicate the unassociated station has the first frame to send to the AP.

Correspondingly from AP perspective, the first RU is a RU assigned to a responding unassociated station that has responded a NDP feedback report response of a first type. With reference to 802.11 ax D4.1, whether the response is FEEDBACK_STATUS=1 [e.g. first response type] (i.e. using a specific tone group from the groups forming the responding RU tone set) or FEEDBACK_STATUS=0 [second response type], the responding unassociated non-AP station may or may not be offered a RU in the UL MU operation, and consequently may or may not receive a temporary AID in the acknowledgment of the UL MU operation. Use of the feedback type makes it possible for the AP to early discriminate different requests (needs) for unassociated non-AP stations, in order to serve them appropriately and then to provide temporary AIDs only to appropriate unregistered non-AP stations.

According to a specific feature, the unassociated station sends a NDP feedback report response of a second type to trigger responsive transmission by the AP of a Probe Response frame.

Correspondingly from AP perspective, the method further comprises, at the AP, sending a broadcast Probe Response frame if at least one of the received NDP feedback report responses is a NDP feedback report response of a second type (different from the first type). By using the FEEDBACK_STATUS (through an appropriate value of a Feedback Type field in RA-NFRP trigger frame), the AP can distinguish between unassociated non-AP stations that only desire having information on the AP (a mere Probe Response is consequently enough) and those willing to register to the AP (in which case subsequent frame exchanges are needed, which can be performed through the UL MU operation introduced above).

In some embodiments, a starting AID defined in the RA-NFRP trigger frame includes a predefined AID value, for instance 2045, corresponding to a random access for the unassociated stations to the plurality of RU tone sets. The Starting AID field is for instance defined in Draft 4.1 of IEEE 802.11ax. This provides an easy way to signal random access for unassociated stations, while keeping the existing format of the NFRP trigger frame.

In some embodiments, selecting the first RU comprises:
determining whether the previous trigger frame provides a random RU reserved for unassociated stations to which the unassociated stations access based on contention,
determining whether the previous trigger frame provides a RU with an associated AID corresponding to an index of a responding RU tone set previously used by the unassociated station to send a NDP feedback report response to the AP, and
if both determining steps are positive, selecting, as first RU, the RU with the associated AID corresponding to the index of the responding RU tone set. In other words, the unassociated station gives priority to the RU assigned by the AP to a NFRP-responding station rather than to a random RU. This priority-based approach helps to reduce risks of collision in the random RUs and improves network usage since another unregistered non-AP station may use the random RU.

This may be done by an appropriate ordering in the previous trigger frame given this station's behavior when processing the declared RUs. For instance, the previous trigger frame first declares all the resource units (it may be a single one) assigned to responding unassociated non-AP stations using indexes of corresponding responding RU tone sets and then declares all the random resource units (may be a single one) reserved for unassociated non-AP stations to which the unassociated non-AP stations access based on contention. The unassociated non-AP stations may thus merely read the declaration and select the first-declared RU on which they are allowed to transmit.

In some embodiments, the method further comprises, at the unassociated station:
receiving, from the AP, a subsequent trigger frame reserving a plurality of resource units, RUs, including a second RU, for uplink multi-user, UL MU, transmissions to the AP, wherein the second RU is assigned to the unassociated station using the temporary AID.

Correspondingly from AP perspective, the method may further comprise, at the AP, sending a subsequent trigger frame reserving a plurality of resource units, RUs, including a second RU, for uplink multi-user, UL MU, transmissions from stations, wherein the second RU is assigned to the unassociated station using the temporary AID.

Consequently, the unassociated non-AP station is now involved in UL MU operations, and more precisely is scheduled by the AP, even if it is not yet registered to it. This substantially accelerate frame exchanges between the unassociated non-AP station and the AP, for instance to register. It turns that network usage is improved.

For registration purposes, the method may further comprise, at the unassociated station:
sending a subsequent association management frame (usually a request) to the AP over the second RU assigned to the unassociated station using the temporary AID, and
receiving a definitive AID from the AP in response to the subsequent association management frame.

Correspondingly from AP perspective, the method may further comprise, at the AP, receiving a subsequent association management frame from the unassociated station over the second RU assigned to the unassociated station using the temporary AID, and providing a definitive AID to the unassociated station in response to the subsequent association management frame.

For instance, the definitive AID may be the temporary AID.

Indeed, the first frame may be an authentication request while the subsequent association management frame may be the association request ending the IEEE 802.11 association procedure.

In some embodiments, performing the step of obtaining the temporary AID for the unassociated station depends on a type of the first frame. This makes it possible for the AP to allocate temporary AIDs only to unassociated non-AP stations willing to associate (i.e. if the first frame is an association management frame).

In some embodiments seeking to manage the temporary AIDs, the method may further comprise, at the AP or the unassociated station, releasing (i.e. disabling or deactivating) the temporary AID for the unassociated station upon detecting a temporary AID releasing event, the temporary AID releasing event being one event from:
a provision of a definitive AID by the AP to the unassociated station upon completion of an association procedure of the unassociated station to the AP. Indeed, as the station is now associated with its own AID, it will use the definitive AID and the temporary AID can be released,
a failure in an association procedure of the unassociated station to the AP, and
an expiry of a predefined temporary AID lifetime timer. For instance, the predefined temporary AID lifetime timer may be based on an Association Timeout Information value transmitted by the AP. Such value is defined in 802.11 ai of Dec. 30, 2016. Using such value defined in the standard advantageously avoids having additional parameters to be used.

In some embodiments related to the registration of the non-AP stations, the first frame is a management frame, for instance an association management frame to register the unassociated station to the AP.

In some embodiments, the temporary AID is associated with a MAC address of the unassociated station, within the multi-station block acknowledgment.

For instance, the temporary AID is stored in a Reserved subfield of a BA Information field of a multi-station block acknowledgment (MSTA-BA) frame as defined in Draft 4.1 of IEEE 802.11 ax. This approach allows retrocompatibility with the existing 802.11 ax format of the MSTA-BA.

Another aspect of the invention relates to a non-transitory computer-readable medium storing a program which, when executed by a microprocessor or computer system in a communication device, causes the communication device to perform any method as defined above.

The non-transitory computer-readable medium may have features and advantages that are analogous to those set out above and below in relation to the communication methods and devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIGS. 9a and 9b illustrate, using flowcharts, corresponding general steps at the access point and at a non-AP station, respectively.

DETAILED DESCRIPTION

The invention will now be described by means of specific non-limiting exemplary embodiments and by reference to the figures.

In the description, the term legacy refers to non-802.11 ax stations, meaning 802.11 stations of previous technologies that do not support OFDMA communications.

Figure 1:
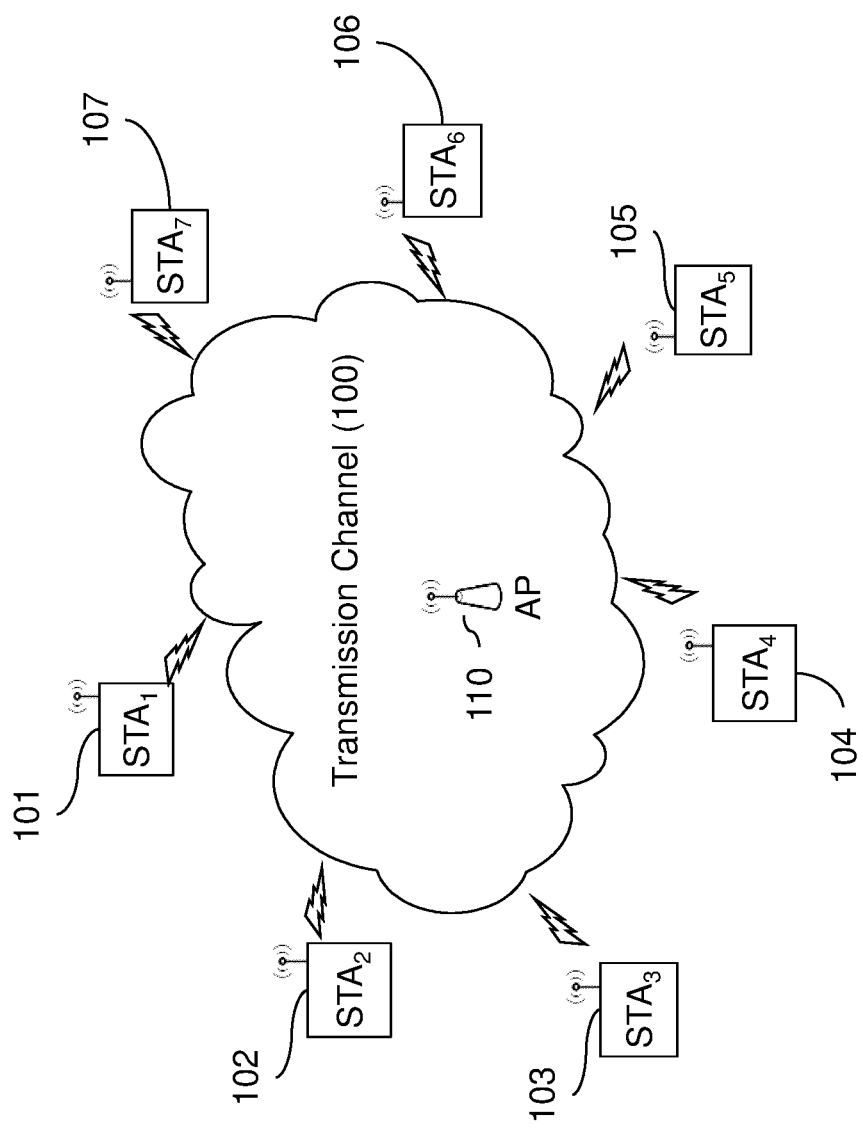
FIG. 1 illustrates a communication system in which embodiments of the invention may be implemented.

FIG. 1 illustrates a communication system in which several communication stations (or "nodes") 101-107 exchange data frames over a radio transmission channel 100 of a wireless local area network (WLAN), under the management of a central station, or access point (AP) 110, also seen as a station of the network. The radio transmission channel 100 is defined by an operating frequency band constituted by a single channel or a plurality of channels forming a composite channel.

In the following, the word "station" refers to any kind of station. The wording "access point station", or in short "access point" (AP), refers to the station playing the role of access point 110. The wording "non-access point station", or in short "non-AP station", or client station (STA) refers to the other stations 101-107. In the following, the terms HE STA and HE AP refer respectively to an 802.11ax non-AP STA and an 802.11ax AP. A non-AP station may be registered to the AP in order to participate to a network cell (or BSS) managed by the AP itself or the non-AP station may not be registered. The expressions "unassociated station" and "non-associated stations" are equivalent and relates to such a non-AP station not-yet associated or registered to the AP.

Access to the shared radio medium to send data frames is primarily based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source or transmitting station, including the AP, first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the source station continues to wait until the radio medium becomes idle.

The wireless communication system of FIG. 1 comprises physical access point 110 configured to manage the WLAN BSS (Basic Service Set), i.e. a group of non-AP stations which have previously registered to the AP. Such BSS managed by the AP is called an infrastructure BSS. In the following, the term BSS will be used as an equivalent of infrastructure BSS.

Once the BSS is established, the Access Point can bridge traffic inside the BSS or from other networks (e.g. wired networks) into the BSS (or vice and versa). Thus, the non-AP stations of the BSS should talk to the AP only, which is in charge of relaying data frames if the data frames are targeted to another station of the BSS.

A physical access point 110 may be configured to manage two or more WLANs (or BSSs), i.e. two or more groups of station. Each BSS is uniquely identified by a specific basic service set identifier, BSSID, and managed by a virtual AP implemented in the physical AP. A MAC address of the virtual AP is used as BSSID. Generally, the MAC addresses for the virtual APs are generated based on (or "derive from") a base MAC address specific to the physical access point, usually the base 48-bit MAC address of AP 110.

Within the context of a multiple BSSID set, one virtual AP is referred to as the 'transmitted BSSID' (only one per the multiple set) if the AP emits beacon frames (Other BSSID of an AP belonging to a multiple BSSID set is a 'nontransmitted BSSID'. The beacon frame includes the basic profiles and each profile elements that are mandatory for the non-transmitted BSSID. A BSSID Index is a value that identifies the nontransmitted BSSID, where value is a nonzero.

To access the medium, any station, including the AP, starts counting down a backoff counter designed to expire after a number of timeslots when the medium is sensed as idle. The backoff counter is chosen randomly in a so-called contention window [0, CW], where CW is an integer. This backoff mechanism or procedure, also referred to as Distributed Coordination Function (DCF) contention-based channel access scheme, is the basis of the collision avoidance mechanism that defers the transmission time for a random interval, thus reducing the probability of collisions on the shared channel. After the backoff time expires (i.e. the backoff counter reaches zero), the source station may send data or control frames if the medium is still idle.

Conventional single-user transmission can occur on at least a primary 20 MHz channel (used for contention) and some secondary 20 Mhz channels: The resulting bandwidth of an operating channel may be e.g. 20 MHz, 40 MHz, 80 MHz, 80+80 MHz, or 160+160 MHz, or 320 MHz. The channels may include one or more subcarriers or tones, for instance a 20 MHz channel is made of 242 tones.

Management of quality of service (QoS) has been introduced at station level in the wireless networks, through well-known EDCA mechanism defined in the IEEE 802.11e standard.

Developments in the 802.11 ax standard seek to enhance efficiency and usage of the wireless channel for dense environments.

In this perspective, multi-user (MU) transmission features have been considered that allow multiple simultaneous transmissions to/from different non-AP stations in both downlink (DL) and uplink (UL) directions from/to the access point. In the uplink, multi-user transmissions can be used to mitigate the collision probability by allowing multiple non-AP stations to simultaneously transmit to the AP.

To actually perform such multi-user transmission, it has been proposed to split a legacy 20 MHz channel into at least one subchannel, but preferably a plurality of sub-channels (elementary sub-channels), also referred to as sub-carriers or resource units (RUs) or "traffic channels", that are shared in the frequency domain by multiple users, based for instance on Orthogonal Frequency Division Multiple Access (OFDMA) technique. In some embodiments, the bandwidth of the RUs may be based on a number of active data subcarriers. In some embodiments, the bandwidth of the RUs is based on 26, 52, 106, 242 (a whole 20 MHz channel), 484 (40 MHz channel), 996 (80 MHz channel), or 2×996 (80+80 Mhz or 160 Mhz channel) active data subcarriers or tones.

While the MU DL transmission is fully managed by the AP, the MU UL transmission requires the AP sends a control frame to the non-AP station to trigger the simultaneous MU UL transmissions from the non-AP stations. Such control frame is known as a Trigger Frame (TF), various variants of which exist depending on the usage of the MU UL sub-carriers desired by the AP. Multi-STA BA (Multi-station Block Acknowledgement) allows the AP to simultaneously acknowledge all the MPDUs received in a MU UL transmission from various non-AP stations. Multi-STA BA substantially improves channel efficiency because it aggregates and transmits a plurality of ACKs in one frame.

For both MU schemes, the AP signals the assignment of the RUs to the non-AP stations from the very beginning of the MU DL frame or in the Trigger Frame for MU UL operation. This allows the non-AP stations to know whether they are involved in the MU DL or UL transmission.

The signalling is performed by providing for each RU the association identifier, AID, of the involved non-AP station. An AID is usually formed of a 12-bit identifier. Such AID is individually obtained by each non-AP station at the end of the registration or "association" procedure with the AP.

The AIDs are also used by the AP in the MultiSTA-BA frames to individually signal to each non-AP station whether the MPDUs it had sent have been well received by the AP.

Figure 1A:
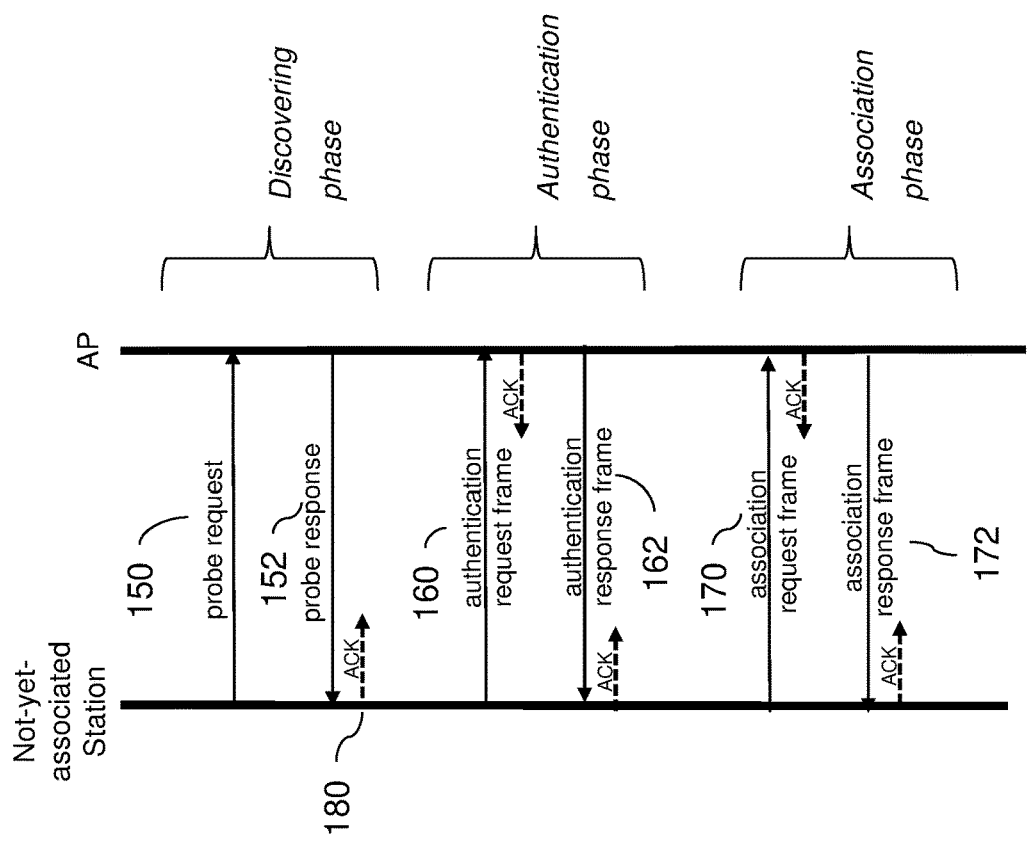
FIG. 1a illustrates an exemplary sequence of management frames allowing a not-yet-associated station to discover and register with a given Access Point.

As shown in FIG. 1a, during the association procedure, the not-yet-associated non-AP station exchanges a series of single user (SU) 802.11 association management frames with the AP, namely Probe Request/Response frames, Authentication Request/Response frames and Association Request/Response frames.

FIG. 1a illustrates an exemplary sequence of association management frames allowing a not-yet-associated non-AP station to discover and register with the AP. It comprises three phases: WLAN discovery, authentication and association, at the end of which the station enters into an authenticated and associated state with the AP. Note that the non-AP station may be currently associated with a first AP (i.e. belonging to a first WLAN) and willing to join a second WLAN (with which it is not associated).

The WLAN discovery phase includes for the unassociated non-AP station to gather information about the APs, for instance by sending out Probe Request frames 150 on each wireless 20 MHz channel. In response to receiving such a Probe Request frame, the AP checks whether the unassociated non-AP station has a common supported data rate or not. In the affirmative, the AP responds with a Probe Response frame 152 providing details of the WLAN: SSID (wireless network name), supported data rates, encryption types, and other 802.11 capabilities of the AP.

A non-AP station (possible already registered for a WLAN but seen as unassociated for other WLANs) may send Probe Request frames regularly onto other wireless channels to maintain an updated list of available WLANs without any intend to associate with the other WLANs. However, it allows the non-AP station to possible roam to another AP with a better signal strength (using the second and third phases of the association procedure) if needed.

Once the unassociated non-AP station has decided to join a WLAN (based on information gathered from the various WLANs), it performs the second and authentication phase during which it sends a low-level 802.11 Authentication Request frame 160 to the selected AP. The AP may respond with an Authentication Response frame 162.

Again, the unassociated non-AP station may authenticate to multiple APs without seeking to be associated with them. This is to speed up the whole association procedure when the unassociated non-AP station finally decides to move to another WLAN.

Next, the unassociated non-AP station performs actual association with the AP to join the WLAN cell. This stage finalizes the security and bit rate options and establishes the data link between the unassociated non-AP station and the AP. The purpose of this final exchange is for the unassociated non-AP station to obtain its Association Identifier (AID) to be used to access the medium and send data within the joined WLAN. To do so, the unassociated non-AP station sends an Association Request frame 170 to the AP of the WLAN it wishes to join. The Association Request frame contains chosen encryption types if required and other compatible 802.11 capabilities.

If the elements in the Association Request frame match the capabilities of the AP, the AP creates an Association ID (AID) for the unassociated non-AP station and responds with an Association Response frame 172 including the AID and a success message granting network access to the station. Now the non-AP station is successfully associated with (registered to) the AP and data transfer can begin in the chosen WLAN using the AID.

To be noted that the range of AIDs available for assignment to the non-AP stations is shared between the multiple groups of stations (i.e. several BSSs) that could be handled by the same physical AP.

The Probe Response frame 320, Authentication Request/Response frames 340 and 350 and Association Request/Response frames 360 and 370 are unicast management frames emitted in an 802.11 legacy format, known as a single user (SU) format. This is a format used for point-to-point communication (here between the AP and the station). Each of these unicast management frames is acknowledged by an ACK frame 180.

A non-AP station is thus either registered with the AP (in that case it has an own AID) or not yet registered with the AP (in which case, it has no AID until registration is completed).

The association procedure is bandwidth consuming because the SU association management frames are transmitted at low bit rate (usually the lowest common data rate supported by both the non-AP station and the AP) over the 20 MHz channel, in order for legacy non-AP stations to understand the common 802.11 preamble.

It is bandwidth consuming also because each SU association management frame requires a specific access to the medium by the sending (AP or non-AP) station, and thus requires for this station to wait until being granted a new medium access. As the number of BSSs increases in the same area and/or as the number of stations within a BSS substantially increases, more channel bandwidth is lost due to such SU signaling, and the cost to access the medium by the stations increases.

By relying on the AID of the non-AP stations, the MU schemes are available for registered non-AP stations.

Recently, the 802.11ax task group has proposed a mechanism for the AP to provide one or more RUs of a MU UL OFDMA transmission for not-yet-associated stations (which are 802.11ax compliant) through a random access mechanism. This aims at speeding up unassociated non-AP station's registration to the AP, because these non-AP stations may take any MU UL opportunity to send their request management frames. Specific random RUs for these unassociated non-AP stations are signaled in a Basic trigger frame using a predefined AID value equal to 2045.

This mechanism has also drawbacks.

RUs defined by a basic trigger frame are often with large duration. Therefore, lost random RUs, due to unuse or collision, are severely detrimental to network efficiency.

In addition, even if the request management frames benefit from the high bitrate of the MU UL transmission, the response management frames from the AP are still transmitted using the low bit rate SU mode. This is because, by failing to have an own AID, the unassociated non-AP stations (having transmitting request management frames) cannot be targeted by the AP (i.e. assigned with RUs) in a MU DL transmission performed by the AP.

More generally, the lack of AID for the unassociated non-AP station is detrimental to an efficient usage of a wireless network.

The present invention seeks to overcome the foregoing limitations. In this perspective, the invention proposes an innovative mechanism that provides an early delivery of an AID for unassociated non-AP stations without additional frames and without modifying management frame (the legacy format can be conserved for association management frames). This is particularly well adapted to the provision of a temporary AID for registration purposes, i.e. until the non-AP station obtains its definitive AID from the AP.

To this end, embodiments of the present invention provide the sending, by the AP to an unassociated non-AP station, of an acknowledgment frame to acknowledge a first frame received from the unassociated non-AP station, wherein the acknowledgment frame is a Multi-STA BA frame providing a temporary AID to the unassociated station.

It turns that subsequent exchanges between the AP and the non-AP stations can rely on the temporary AID. This offers the possibility for the AP to send response management frames (for registration purposes) during MU DL transmissions rather than using the low bitrate SU mode. This also offers the possibility for the unassociated non-AP station to be directly scheduled in subsequent MU UL transmissions, rather than to contend for access to random RUs where collision may still occur.

Consequently, network bandwidth is substantially saved while exchanges between the AP and the non-AP stations (e.g. an association procedure) are speeded up.

Figure 2:
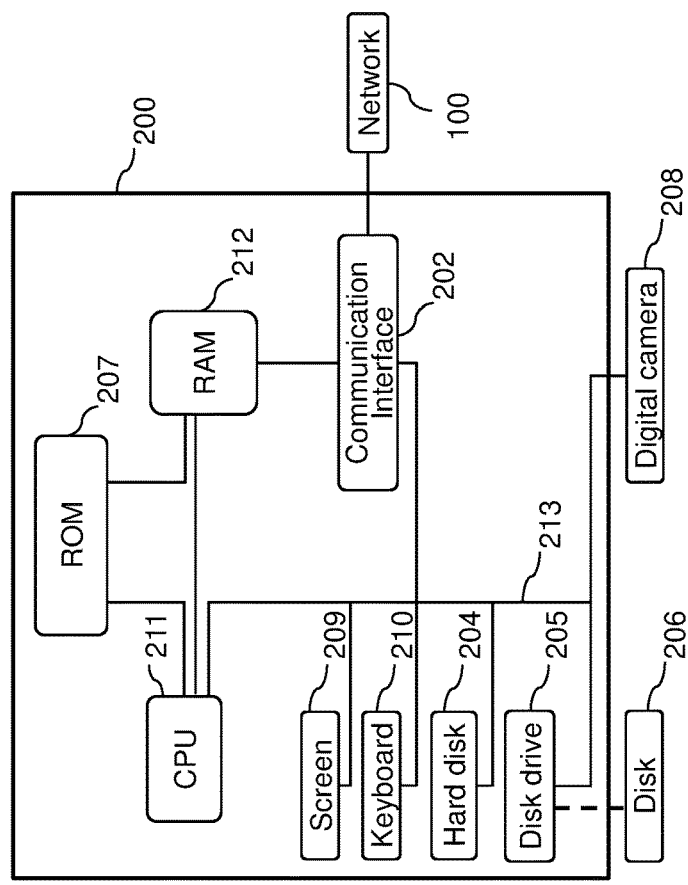
FIG. 2 shows a schematic representation a communication device in accordance with embodiments of the present invention.

FIG. 2 schematically illustrates a communication device 200 of the radio network 100, either the AP 110 or any non-AP STA 101-107, configured to implement at least one embodiment of the present invention. The communication device 200 may preferably be a device such as a microcomputer, a workstation or a light portable device. The communication device 200 comprises a communication bus 213 to which there are preferably connected:

a central processing unit 211, such as a microprocessor, denoted CPU;

a read only memory 207, denoted ROM, for storing computer programs for implementing the invention;

a random-access memory 212, denoted RAM, for storing the executable code of methods according to embodiments of the invention as well as the registers adapted to record variables and parameters necessary for implementing methods according to embodiments of the invention; and at least one communication interface 202 connected to the radio communication network 100 over which digital data packets or frames or control frames are transmitted, for example a wireless communication network according to the 802.11 ax/be protocols. The frames are written from a FIFO sending memory in RAM 212 to the network interface for transmission or are read from the network interface for reception and writing into a FIFO receiving memory in RAM 212 under the control of a software application running in the CPU 211.

Optionally, the communication device 200 may also include the following components:

a data storage means 204 such as a hard disk, for storing computer programs for implementing methods according to one or more embodiments of the invention;

a disk drive 205 for a disk 206, the disk drive being adapted to read data from the disk 206 or to write data onto said disk;

a screen 209 for displaying decoded data and/or serving as a graphical interface with the user, by means of a keyboard 210 or any other pointing means.

The communication device 200 may be optionally connected to various peripherals, such as for example a digital camera 208, each being connected to an input/output card (not shown) so as to supply data to the communication device 200.

Preferably the communication bus provides communication and interoperability between the various elements included in the communication device 200 or connected to it. The representation of the bus is not limitative and in particular the central processing unit is operable to communicate instructions to any element of the communication device 200 directly or by means of another element of the communication device 200.

The disk 206 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to embodiments of the invention to be implemented.

The executable code may optionally be stored either in read only memory 207, on the hard disk 204 or on a removable digital medium such as for example a disk 206 as described previously. According to an optional variant, the executable code of the programs can be received by means of the communication network 203, via the interface 202, in order to be stored in one of the storage means of the communication device 200, such as the hard disk 204, before being executed.

The central processing unit 211 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 204 or in the read only memory 207, are transferred into the random access memory 212, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 3:
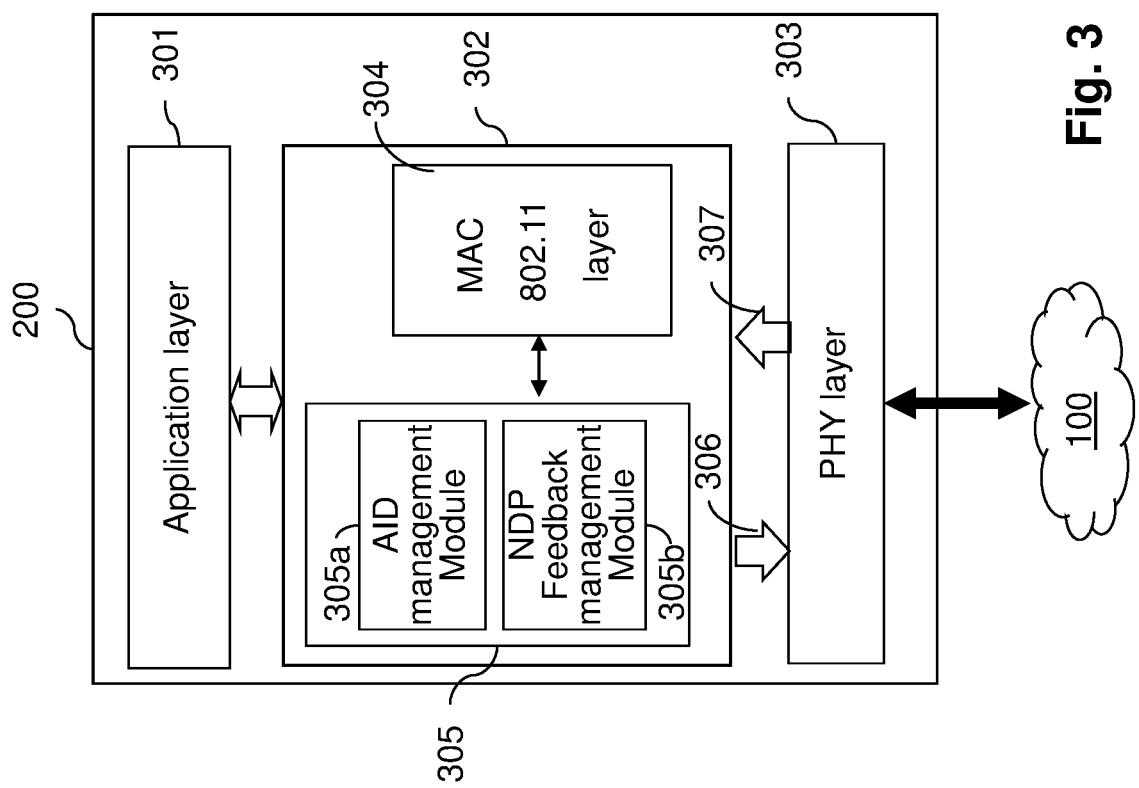
FIG. 3 schematically illustrates functional blocks of a communication device in accordance with embodiments of the present invention.

FIG. 3 is a block diagram schematically illustrating the architecture of the communication device 200 adapted to carry out, at least partially, the invention. As illustrated, communication device 200 comprises a physical (PHY) layer block 303, a MAC layer block 302, and an application layer block 301.

The PHY layer block 303 (e.g. a 802.11 standardized PHY layer) has the task of formatting, modulating on or demodulating from any 20 MHz channel or the composite channel, and thus sending or receiving frames over the radio medium used 100, such as 802.11 frames, for instance single-user frames, such as control frames (e.g. multi-STA block-ACK, Trigger Frame), MAC data and management frames, based on a 20 MHz width to interact with legacy 802.11 stations or with 802.11 ax/be in legacy mode (such as for Trigger Frames), as well as MAC data frames of OFDMA type having preferably smaller width than 20 MHz legacy (typically 2 or 5 MHz), as well as NDP frames having preferably a PHY header transmitted on 20 MHz width and a short payload consisting on energy located on non-contiguous subcarriers or tones, to/from that radio medium.

The MAC layer block or controller 302 preferably comprises a MAC 802.11 layer 304 implementing conventional 802.11 ax/be MAC operations, and an additional block 305 for carrying out, at least partially, embodiments of the invention. The MAC layer block 302 may optionally be implemented in software, which software is loaded into RAM 212 and executed by CPU 211.

Preferably, the additional block 305 includes two blocks, referred to as AID management module 305a and NDP Feedback Management module 305b respectively.

AID management module 305a is configured to implement steps according to embodiments that are performed by the communication device 200, notably managing the temporary AIDs such as requesting a temporary AID for a requesting station and allocating a temporary AID for a responding station (the AP).

NDP Feedback Management module 305b is configured to implement steps according to embodiments where a short feedback procedure is implemented. This module 305b is configured to transmit operations for a transmitting/responding station and receiving operations for a receiving station.

Interfaces 306 and 307 are used by the MAC and PHY layer blocks to interact and to exchange information through TXVECTOR (from the MAC to the PHY layer—306) and the RXVECTOR (from the PHY to the MAC block—307). The TXVECTOR and RXVECTOR are defined in the clause 27.2.2 of the draft 4.1 of the 802.11 ax standard.

On top of the Figure, application layer block 301 runs an application that generates and receives data packets, for example data packets of a video stream or management frames for selecting a new BSS. Application layer block 301 represents all the stack layers above MAC layer according to ISO standardization.

Embodiments of the present invention are now illustrated using various exemplary embodiments.

Figure 4B:
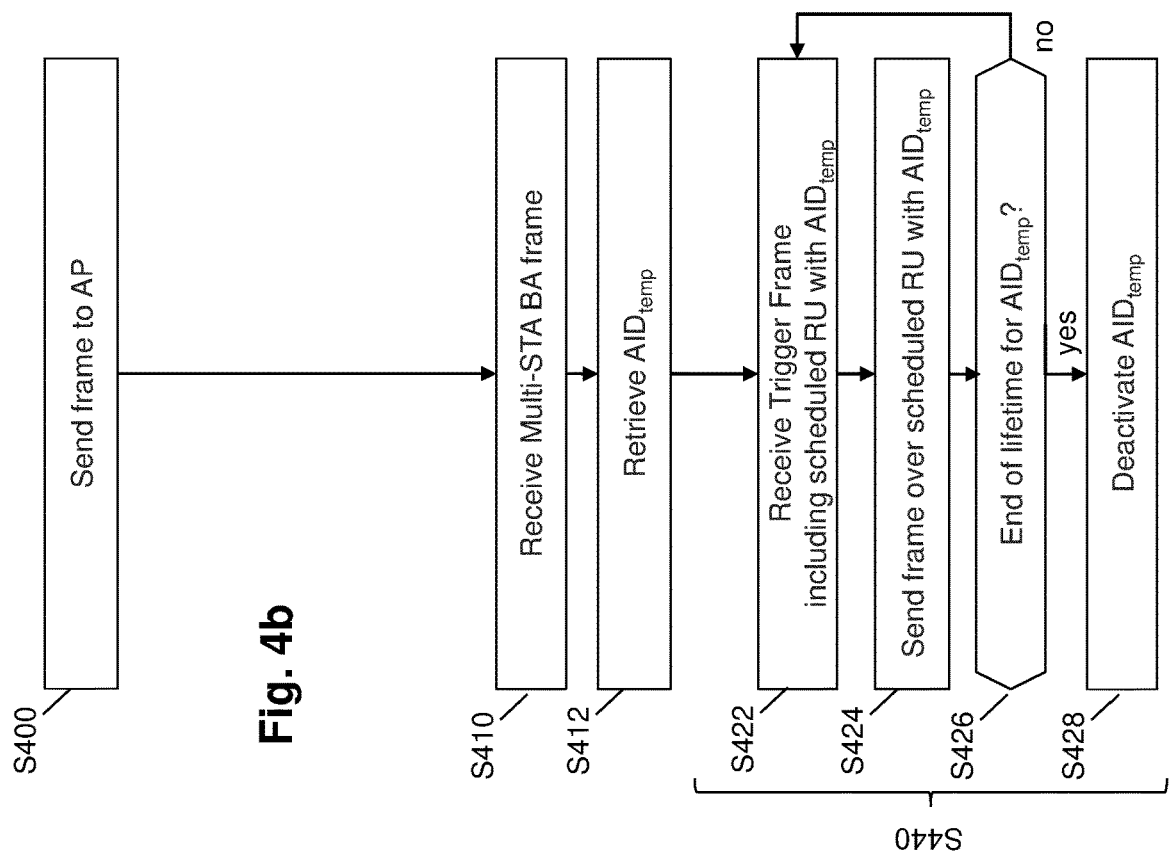
FIGS. 4a and 4b illustrate, using flowcharts, general steps of embodiments of the invention, at the access point and at an unassociated non-AP station, respectively.
Figure 4A:
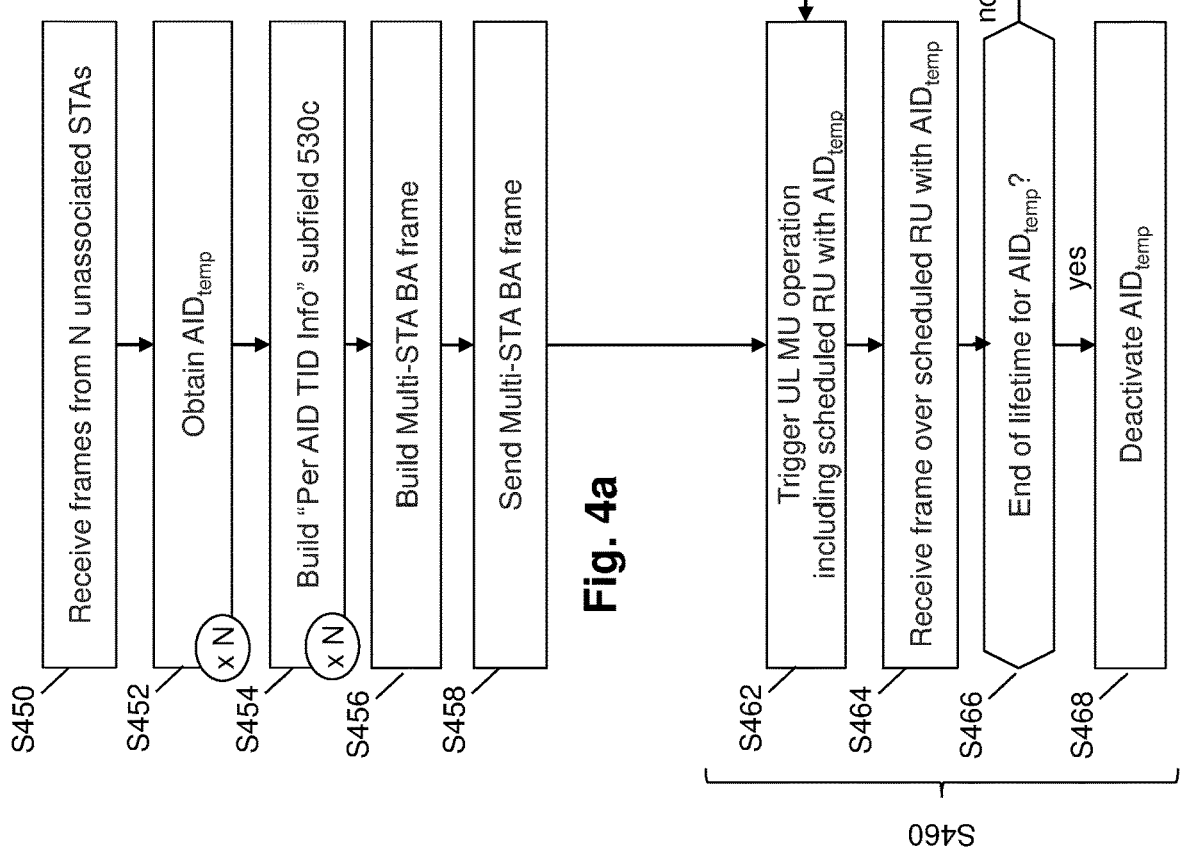

FIGS. 4a and 4b illustrate, using flowcharts, general steps of a communication method according to embodiments of the invention at an access point and an unassociated non-AP station respectively.

As explained above, an idea of the present invention is to provide a temporary AID to an unassociated non-AP station using the acknowledgment. The existing format of a Multi-STA block acknowledgment (as defined in 802.11 ax) lets it possible to efficiently add temporary AIDs for multiple unassociated non-AP stations while keeping all the other fields unchanged.

Thanks to the temporary AID, an unassociated non-AP station can be given an opportunity in MU operations to send or receive a frame to or from the AP, for instance an association (request) management frame with a view of registering to the AP.

The provision of the temporary AID may be responsive to reception at the AP of a frame from the unassociated non-AP station. The frame may have been sent by the unassociated non-AP station using the SU mode or more preferably in a MU UL operation triggered by the AP, either a random RU (identified with AID=2045) or a scheduled RU assigned to this specific unassociated non-AP station in a MU UL operation triggered by the AP. The scheduling of an RU while the unassociated non-AP station has not yet an AID is another innovative short feedback procedure as explained in details below with reference to FIGS. 7 to 10.

Consequently, at step S400, the unassociated non-AP station sends a "first" frame to the AP, preferably a request management frame of an association procedure, typically a Probe Request frame 150 or an Authentication Request frame 160. Such first frame requests, implicitly or explicitly (through signaling), a temporary AID to the AP.

At step S450, the AP receives such first frame. Several first frames from several unassociated non-AP stations may be received by the AP either simultaneously (e.g. during a MU UL operation) or over time.

At step S452, the AP obtains a temporary AID for the unassociated non-AP station. This may merely consist in selecting an AID available from amongst the range of AIDs the AP can assigned to non-AP stations upon registration. In variants, the AP may also select an AID from a restricted set of AIDs reserved for temporary usage (the restricted set being or not within the above range of AIDs reserved for registration, and the restricted set being ready for fast retrieval during the SIFS period that lasts between the reception of the frame and the emission of acknowledgment).

The AP performs step S452 for each unassociated non-AP station corresponding to a frame received at step S450 that requests a temporary AID. In variant, any frame from an unassociated non-AP may trigger the obtaining of a temporary AID.

In any case, the AP may check whether a temporary AID still valid has already been delivered to the unassociated non-AP station. For instance, it may retrieve the MAC address of the unassociated non-AP station from the MAC header of the received MPDU and checks whether a valid pair {retrieved MAC address, temporary AID} is stored in a local table storing the valid temporary AIDs. A temporary AID is thus obtained (to be transmitted) only for unassociated non-AP station not yet provided with a temporary AID.

At step S454, the AP builds a Multi-STA BA element for the unassociated non-AP station. This Multi-STA BA element aims at conveying the obtained temporary AID in a Multi-STA BA to be sent, in order for the unassociated non-AP station to be able to retrieve its temporary AID.

Figure 5:
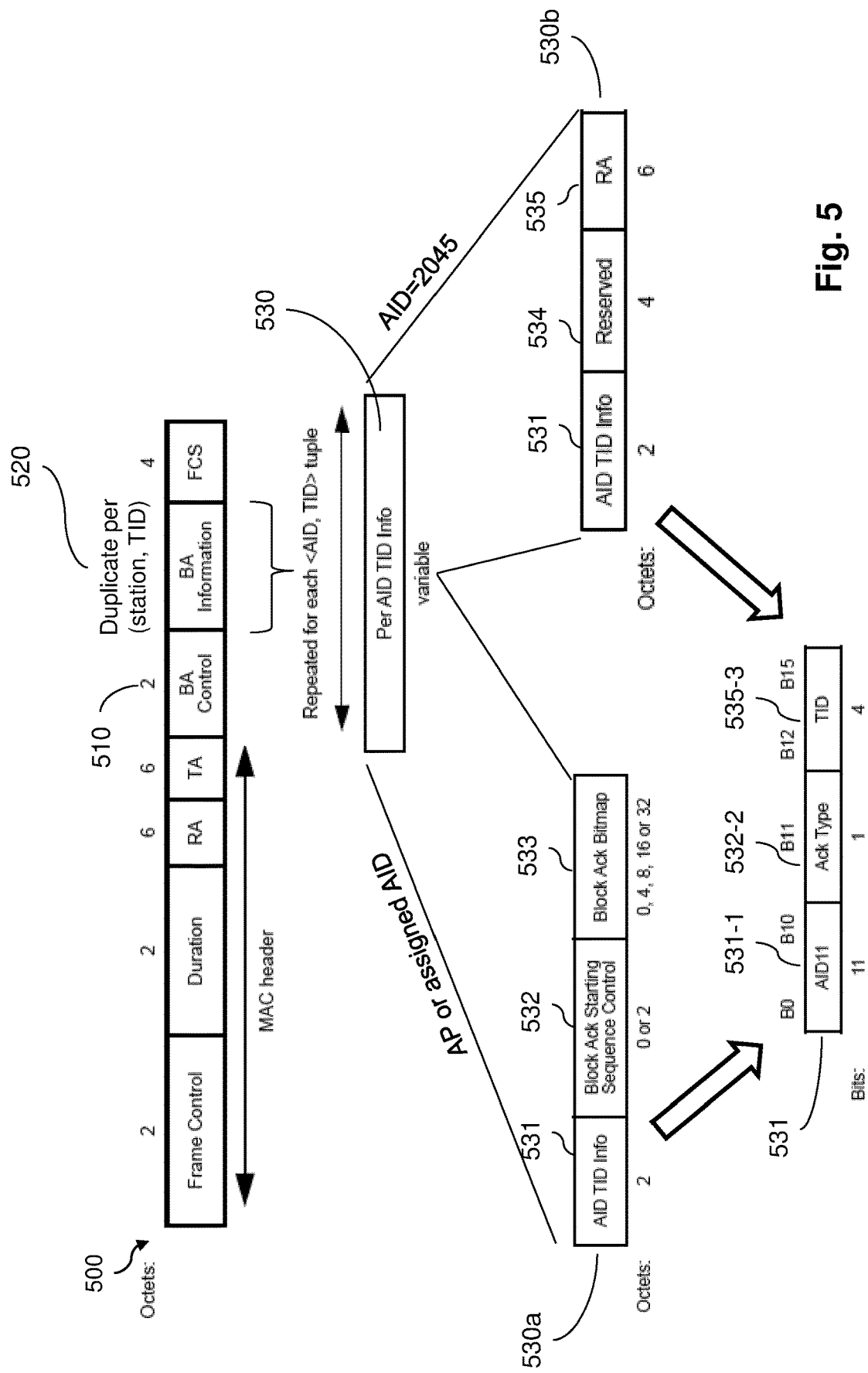
FIG. 5 illustrates the format of a block acknowledgment frame.

FIG. 5 illustrates a conventional Block Ack (BA) 500 as currently used in the 802.11ax D4.1.

The BA frame 500 includes a MAC Header, a BA Control field 510 and a BA Information field 520.

The MAC Header field includes a Frame Control field, a Duration/ID field, an RA field and a TA field. The RA field contains a MAC address of a receiver station (i.e. it is set to a broadcast address when several receiver stations are targeted) and the TA field contains a MAC address of the station (here the AP) transmitting the BA frame 500.

The BA Control field 510 indicates which variant of the BA frame variants is selected. For the present illustration, the "Multi-STA" variant is indicated in which case two bits (so-called BA Type bits) of the BA Control field are set to binary value 11. This variant has been introduced for acknowledgment of any MPDUs carried in a prior 802.11 ax TB PPDU, but also of any MPDUs carried in a prior Multi-STA and/or Multi-TID A-MPDU. In this variant, frame 500 is said to be a Multi-STA BA frame.

The BA Information field 520 of the Multi-STA BA frame 500 comprises one or more "Per AID TID Info" subfields 530, wherein each subfield concerns a specific TID for a specific receiver station. Thus, there are as many subfields 530 as the number of {AID, TID} pairs to be acknowledged by the AP.

The "Per AID TID Info" subfield 530 may be of two different formats 530a or 530b, depending on whether the AID of the pair concerns a registered station (format 530a) or is value 2045 concerning all unregistered non-AP stations (format 530b). The distinction is made because in the first case the AID of the station can be used, while in the second case, a MAC address of the unregistered non-AP station is used.

As shown, when the "Per AID TID Info" subfield 530a acknowledges MPDUs from a registered station (including the AP), it comprises an AID TID Info subfield 531, a Block Ack Starting Sequence Control (SSC) subfield 532 and a Block Ack Bitmap subfield 533.

The AID TID Info subfield 531 comprises an AID11 subfield 531-1 set to the 11 LSBs of the AID of the registered station for which the Per AID TID Info subfield is intended (set to value 0 if the BlockAck is sent by a non-AP station to a receiver AP), and Ack Type 531-2 and TID 531-3 subfields which inform of the interpretation of the Block Ack SSC subfield 532 and Block Ack Bitmap 533 subfields.

When the "Per AID TID Info" subfield 530b acknowledges MPDUs from an unassociated non-AP station, it comprises an AID TID Info subfield 531, a Reserved (i.e. unused for the time being) subfield 534 and an RA subfield 535.

The AID TID Info subfield 531 is as described above where the AID11 subfield 531-1 takes a value equal to 2045, used as a unique identifier for any unassociated non-AP STA. The Ack Type subfield 531-2 and the TID subfield 531-3 are set to 0 and 15, respectively. The RA subfield 535 indicates a MAC address of the unassociated non-AP STA for which the Per AID TID Info subfield is intended. This makes it possible for the unassociated non-AP stations to retrieve the "Per AID TID Info" subfields 530b they are concerned with.

The format 530b has been introduced for the Pre-Association acknowledgment context of 802.11 ax, to make it possible for the AP to acknowledge pre-association Management frames for multiple unassociated non-AP stations using a single Multi-STA BA frame. In other words, the AP that receives a request management frame requiring an acknowledgment prior to association may generate a Multi-STA BA frame using the format 530b.

Figure 5A:
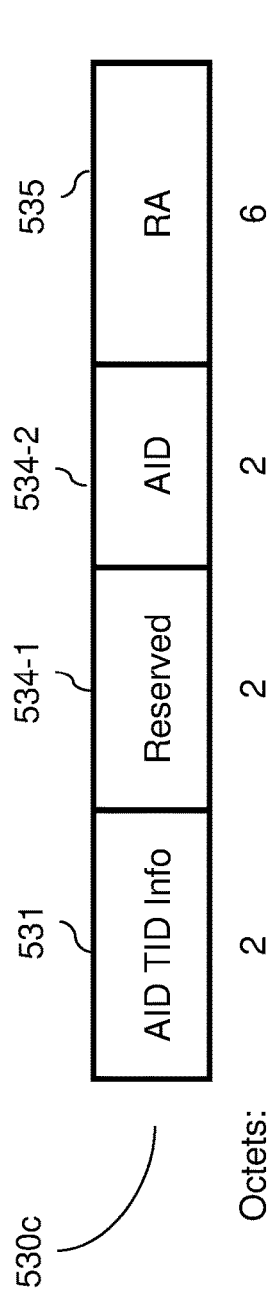
FIG. 5a illustrates the format of a Per-AID TID Info subfield of a Multi-STA block acknowledgment frame according to embodiments of the present invention.

Back to FIG. 4, at step S454, the AP builds a "Per AID TID Info" subfield based on format 530b for each unassociated non-AP station to which a temporary AID must be provided. FIG. 5a illustrates an exemplary "Per AID TID Info" format 530c based on format 530b to efficiently signal temporary AID. Format 530c is advantageously retro-compatible with format 530b as subfields 531 and 535 are kept unchanged.

In format 530c, the temporary AID is associated with a MAC address of the unassociated non-AP station, within the multi-station block acknowledgment. In particular, the temporary AID may be stored in the Reserved subfield 534, for instance subfield 534 is split into a two-byte Reserved (i.e. still unused) subfield 534-1 and a two-byte $AID_{temp}$ subfield 534-2 in which the temporary AID (12 bits) is stored. The pair {$AID_{temp}$ subfield 534-2, RA subfield 535} makes it possible for the targeted unassociated non-AP station to easily retrieve its temporary AID.

Another splitting of the Reserved subfield 534 or arrangement of subfields 534-1 and 534-2 may be contemplated, provided that the 11-bit or 12-bit temporary AID be stored.

Of course, the AP may also build conventional "Per AID TID Info" subfields 530a and Per AID TID Info" subfields 530b to acknowledge received MPDUs not requiring temporary AIDs. For that case, the $AID_{temp}$ subfield 534-2 is provided with a value 0.

Next to step S454, the AP builds (step S456) the Multi-STA BA frame 500 using the "Per AID TID Info" elements generated at step S454 and sends it at step S458. The Multi-STA BA frame 500 can be sent in a SU PPDU or a MU DL PPDU (with broadcast RU having an AID12 field set to 2045). The AP thus sends an acknowledgment frame to acknowledge the received MPDU to the unassociated non-AP station, wherein the acknowledgment frame is a multi-station block acknowledgment frame providing the temporary AID to the unassociated non-AP station.

The unassociated non-AP STA thus receives (S410) the Multi-STA BA frame 500 and retrieves (S412) the temporary AID associated with its own MAC address. It may merely consist in detecting a "Per AID TID Info" element 530c having its MAC address and then in reading the corresponding $AID_{temp}$ subfield 534-2. The unassociated non-AP STA may decide to search amongst the "Per AID TID Info" subfields 530c of the Multi-STA BA frame 500 only if it is waiting for a temporary AID (i.e. having previously sent a frame requesting a temporary AID).

At this stage, both the AP and the unassociated non-AP STA know the allocated temporary AID and can use it, later on, to perform subsequent exchanges S460 and S420 between them.

For instance, the AP may initiate a new MU UL operation. At step S462, the AP sends a subsequent trigger frame reserving a plurality of RUs for UL MU transmissions from the non-AP stations. One of the RUs may then be assigned to the unassociated non-AP station using the temporary AID.

The unassociated non-AP STA receiving such subsequent trigger frame detects whether a RU is scheduled for it (thanks to the temporary AID). This is step S422.

In the affirmative, the unassociated non-AP STA may send (S424) new data to the AP. For instance, during the association procedure, it may send a subsequent association management frame (usually a request) to the AP over this scheduled RU assigned to it using the temporary AID.

Advantageously, such subsequent association management frame may be the final association request frame for the association procedure, in which case the AP receiving (S463) this frame can respond by providing a definitive AID to the unassociated non-AP station. The definitive AID may be the temporary AID, in which case the AP confirms the temporary AID as being definitively allocated to the non-AP station. Consequently, the association procedure is performed using only MU schemes. The drawbacks of using the SU mode are thus overcome.

Next, the AP and the unassociated non-AP station may detect (tests S426 and S466) a temporary AID releasing event.

Such an event may be the provision of the definitive AID as mentioned above, performed by the AP upon completion of an association procedure of the unassociated station to the AP.

In variants, it may be a failure in the association procedure, for instance a refusal from the AP (for security reason or any other reason). It may also be an expiry of a predefined temporary AID lifetime timer. For instance, the predefined temporary AID lifetime timer may be based on an Association Timeout Information value transmitted by the AP.

In the affirmative of such detection, both the AP and the unassociated non-AP station release the temporary AID (steps S428 and S468)—which may become the definitive AID in case of successful association. For the AP, it may mean deleting the pair {$AID_{temp}$, MAC address} from its local database of temporary AIDs, the same AID being for instance definitively associated with the non-AP station in another local database of assigned AIDs. For the unassociated non-AP station, it may mean erasing the $AID_{temp}$ from local registers of temporary AID, while the same AID may be stored in another local register of definitive AID in case of successful association.

Figure 6:
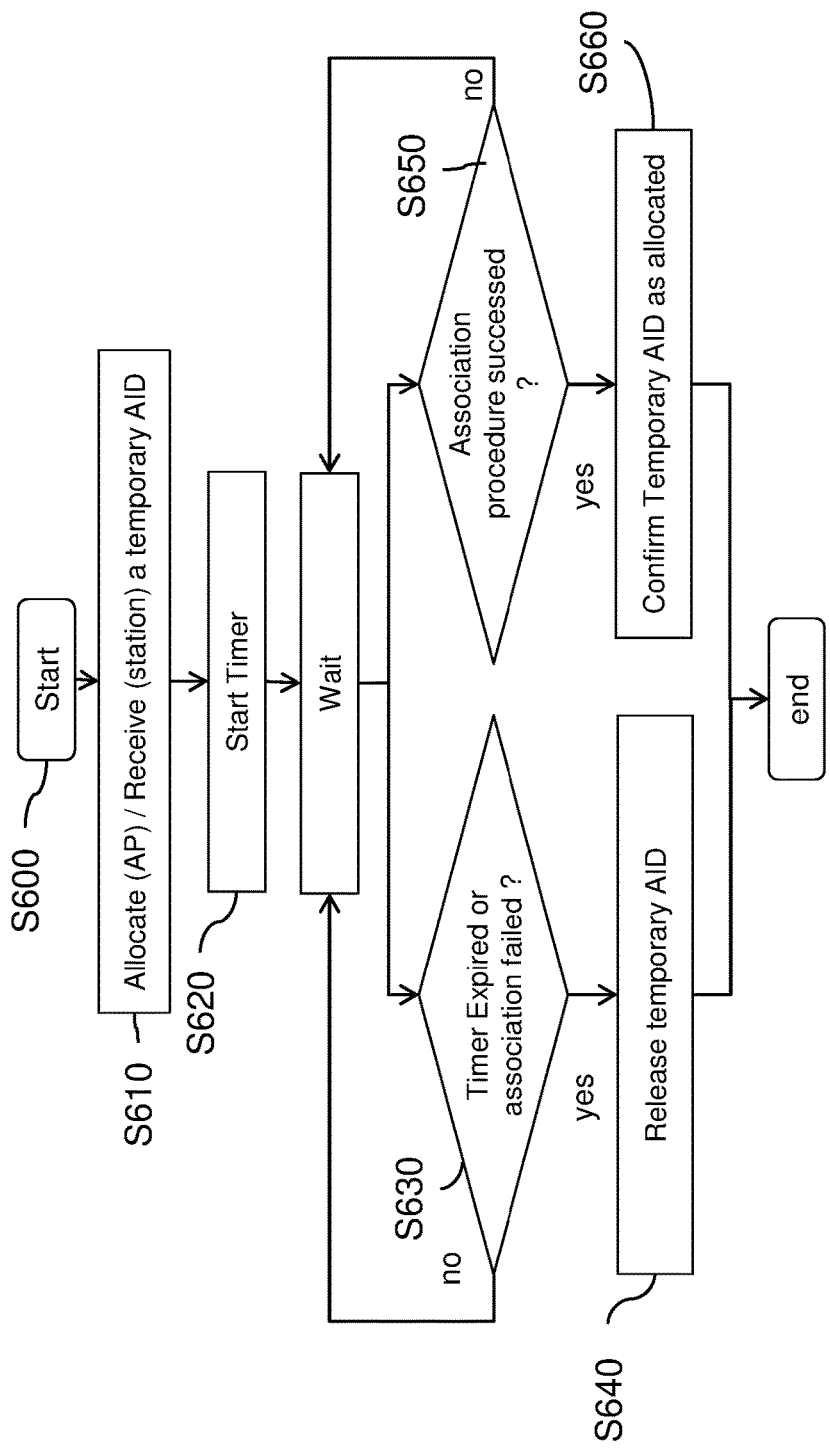
FIG. 6 illustrates, using a flowchart, steps for managing a temporary lifetime of a temporary AID according to embodiments of the invention.

FIG. 6 illustrates, using a flowchart, exemplary general steps to manage a temporary validity of the temporary $AID_{temp}$ at the AP and non-AP stations. The method is performed in parallel by the AP and a non-AP station receiving a temporary AID.

Step S610 consists for the AP to allocate a temporary AID to the unassociated non-AP station and for the non-AP station, to obtain the allocated temporary AID. It may thus correspond to steps S458 (or S452) and S412 previously described.

It is commonly accepted that an association delay lasts several (e.g. 30) Time Units (TUs) in order to have enough time to proceed to the various exchanges of association management frames. The 802.11 standard references Time Unit (TU) as equal to 1024 μsec.

The 802.11ai standard provides an 'Association Timeout Info' element which embeds an unsigned integer value indicating the minimum Association Response timeout in number of TUs.

In some embodiments, the predefined temporary AID lifetime timer may be defined as an integer number of TUs or a multiple of the Association Timeout Info value. The latter and the timer may also be equal one to each other. Preferably, the initializing value for the time is made to several TBTTs (Target Beacon Transmission Time, e.g. 100 ms).

A timeout for $AID_{temp}$ is consequently defined: the temporary AID is considered as valid as long as the timer has not elapsed. The temporary AID thus remains valid for a period greater than a TXOP.

As alternative, the initializing value may be determined by the AP in relation with an average measurement of the time made by the unassociated non-AP stations to perform the association procedure. This is based on history of station associations.

Such initializing value may be shared between the AP and the unassociated non-AP stations through the management frames, e.g. in the beacon frames the AP periodically transmits. Where several multiple BSSs are managed by the AP, this initializing value is preferably conveyed in an information element of the transmitted BSSID profile.

At step S620, the temporary AID lifetime timer is started and uniformly counts down with no suspension when its value is nonzero.

In case of success in the association procedure (test S650), the temporary AID may be declared as definitively assigned to the non-AP station (S660) which may rely on it in the subsequent frame exchanges as long as the non-AP station remains within the BSS. The AP may merely signal the definitive assignment in the Association Response frame 172 delivered to the non-AP station.

In a variant to definitively assigning the temporary AID, the AP may send a definitive AID different from $AID_{temp}$, for instance if $AID_{temp}$ has been selected from a restricted range of reserved AIDs.

In case of failure (test S630, the timer elapses or the association procedure stops), the temporary AID is released and the unassociated non-AP station can no longer use $AID_{temp}$ for frame exchanges. As example, a failure may be reported when no elements in the Association Request frame 170 match the capabilities of the AP.

The AP removes $AID_{temp}$ from its AID list. $AID_{temp}$ is now available for further usage.

As mentioned above with reference to step S400, the first (e.g. association management) frame sent be the unassociated non-AP station may be transmitted over a scheduled RU assigned to this unassociated non-AP station in a MU UL operation triggered by the AP. This innovative scheduling is based on an innovative short feedback procedure as explained now in details below with reference to FIGS. 7 to 10.

Beforehand, an exemplary short feedback procedure according to 802.11 ax D4.1 is described.

Figure 7:
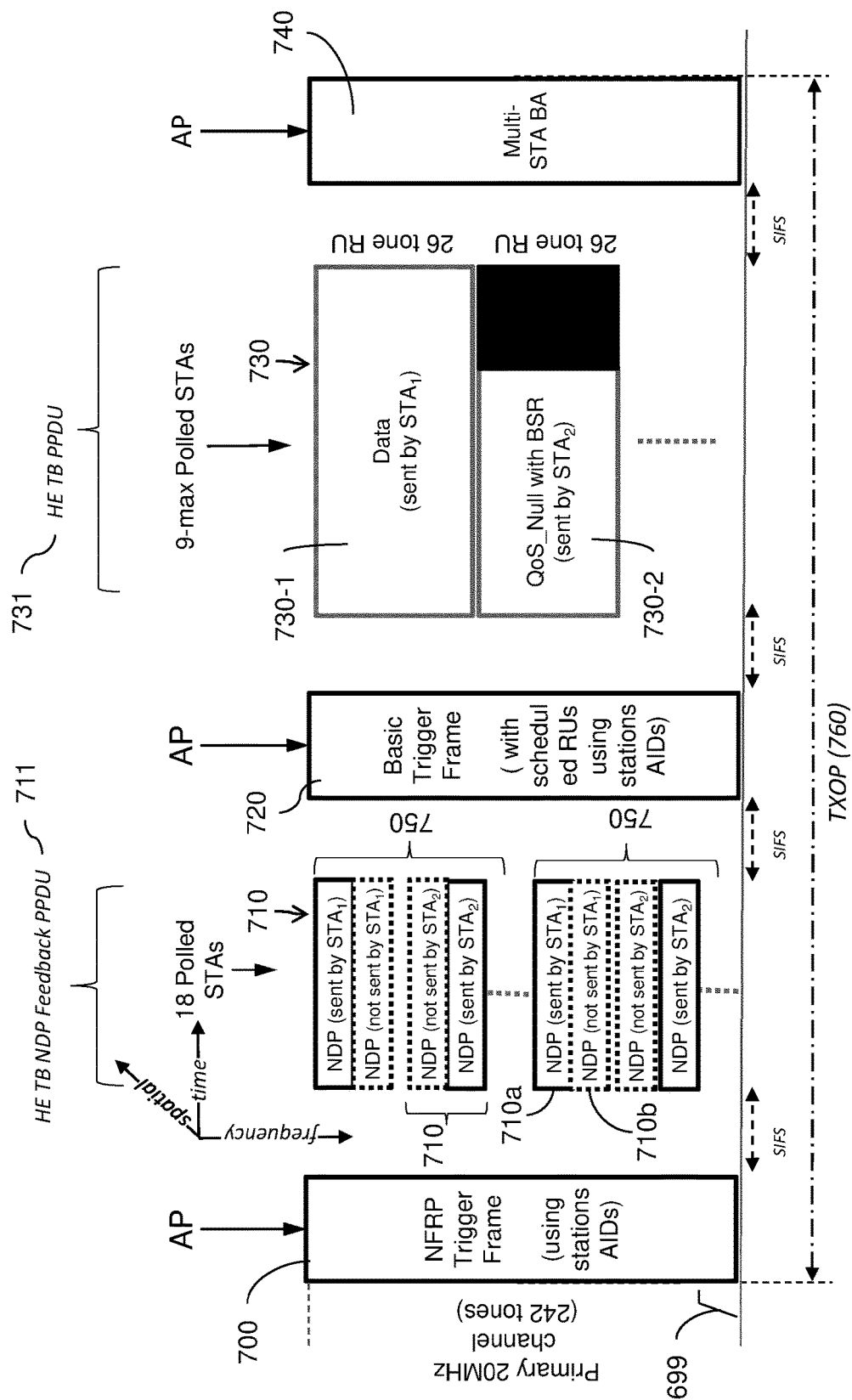
FIG. 7 illustrates two usages of trigger frames.

FIG. 7 illustrates two usages of trigger frames. In the exemplary embodiment shown a short feedback report procedure according to 802.11 ax (as described in section "26.5.7 NDP feedback report procedure" of Draft D4.1 of IEEE 802.11 ax) is shown followed by an UL MU operation (as described in section "26.5.2 UL MU operation" of Draft D4.1 of IEEE802.11ax) based on the results of the short feedback report procedure.

The NDP feedback report procedure allows the AP 110 to collect feedback that is not channel sounding from multiple non-AP STAs 101-107. The AP sends an NFRP Trigger frame to solicit NDP feedback report response from many non-AP STAs that are identified by a range of scheduled AIDs in the NFRP Trigger frame. A non-AP STA uses the information carried in the NFRP Trigger frame to know if it is scheduled, and in this case, may send a NDP feedback report response, usually a HE TB feedback NDP.

Next, based on the received NDP feedback report responses, the AP may, using UL MU operation, solicit simultaneous immediate response frames from one or more of the responding non-AP STAs.

Figure 7A:
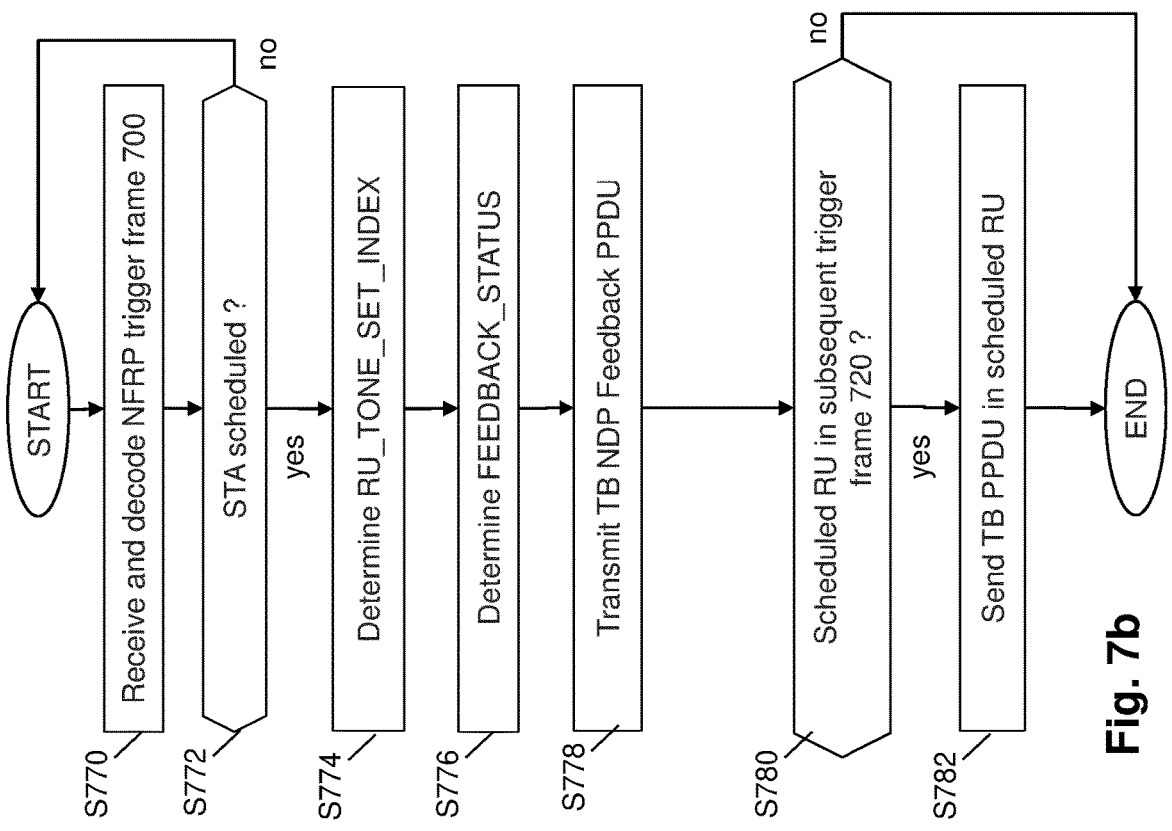
FIGS. 7a and 7b illustrate, using flowcharts, corresponding general steps at the access point and at a non-AP station, respectively.
Figure 7B:
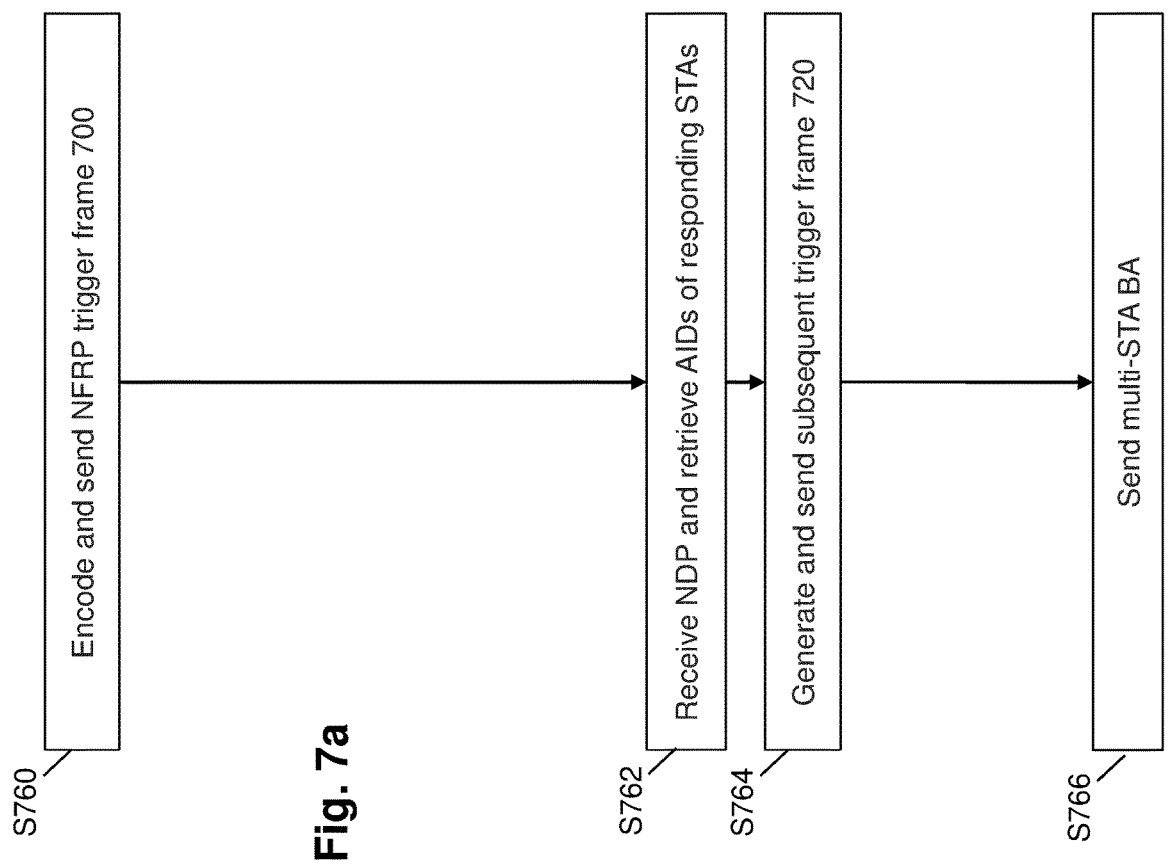

The example shown considers a single 20 MHz channel. Of course, the bandwidth of the channel and the number of RUs splitting a 20 MHz channel may be different from what is depicted. FIGS. 7a and 7b illustrate, using flowcharts, corresponding to general steps at the AP and a non-AP STA, respectively.

The scenario begins at phase 699 wherein the AP 110 accesses the wireless medium. For example, the AP performs a contention-based method (which may include a clear channel assessment and an EDCA backoff) to acquire access to the wireless medium.

Upon accessing the medium, the AP 110 polls non-AP STAs to know their needs for transmission. To do so, it sends an NFRP trigger frame 700 which is a specific trigger frame. It identifies non-AP STAs by a range of scheduled AIDs. This is step S760 of FIG. 7a.

Figures 8A, 8B:
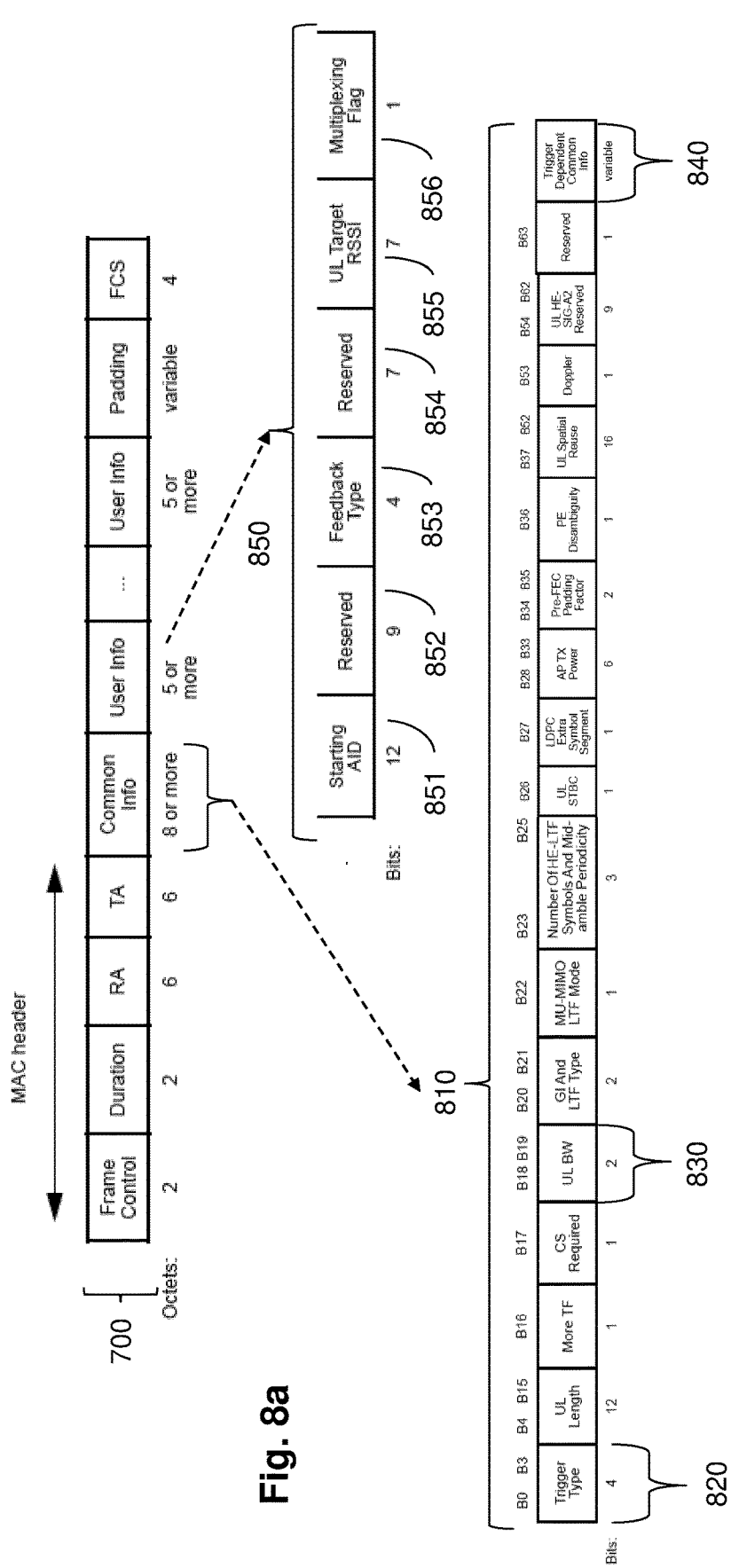
FIG. 8a illustrates the format of a trigger frame, in particular of NFRP type.
FIG. 8b illustrates the format of TB NDP PPDU.

With reference to FIG. 8a, like each and every 802.11 ax trigger frame, NFRP trigger frame 700 comprises:
  a frame header with a standardized "Frame Control" field, a standardized "Duration" field, an "RA" field set to a broadcast MAC address, and a "TA" field set to a MAC address of the AP transmitting the trigger frame,
  a "Common Info" field 810,
  one or more "User Info" fields 850, and
  padding and FCS fields.

The "Common Info" field 810 comprises a "Trigger Type" subfield 820 which specifies the type of the trigger frame. For instance, NFRP trigger frame 700 is signaled by a value 7 in the "Trigger Type" subfield 820. It also comprises a 2-bit "UL BW" field 830 specifying the bandwidth of the channel considered, e.g. BW=0 to define a 20 MHz bandwidth, BW=1 for a 40 MHz bandwidth, BW=2 for an 80 MHz bandwidth, BW=3 for an 80+80 MHz or 160 MHz bandwidth (see Table 9-31c of the D4.1 version of 802.11ax). It ends by a Trigger Dependent Common Info subfield 840 of variable length whose content depends on the "Trigger Type" subfield 820. The other fields shown are of less importance for the present invention.

Specific to the trigger frame of NFRP type, a single "User Info" field 850 is provided that comprises a 12-bit Starting AID field 851, a first reserved 9-bit portion 852, a 4-bit feedback type field 853, a second reserved 7-bit portion 854, a 7-bit UL Target RSSI field 855 and a 1-bit multiplexing flag field 856.

The Starting AID comprises the starting AID of the range of AIDs targeted by the NFRP trigger frame 700, i.e. scheduled to respond to the poll. The range size or width $N_{STA}$ is defined by the "UL BW" field 830 together with the 1-bit multiplexing flag field 856, using the following formula: $N_{STA}=18=2^{BW}\times(MultiplexingFlag+1)$ For instance, when the MultiplexingFlag is set to 0 (no MIMO), 18 non-AP STAs are requested to answer with a feedback response, per 20 MHz operating channel. When the MultiplexingFlag is set to 1, 36 non-AP STAs are scheduled per 20 MHz operating channel. It may be noted that some AIDs in the 18 or 36-wide range may not be currently assigned to a non-AP STA.

The multiplexing flag field 856 defines whether spatiality (MIMO) is provided: the flag indicates the number (minus 1) of non-AP STAs that are multiplexed on the same set of tones in the same RU.

The "feedback type" field 853 indicates a type of feedback that is being polled by the AP. For the time being, 802.11 ax D4.1 only defines a feedback type equal to 0 that is a resource request. The corresponding polling thus seeks to know whether the responding non-AP STAs 101-107 are requesting UL resources to transmit PPDUs to the AP 110.

In the example of FIG. 7, the NFRP trigger frame 700 is sent (step S760) in a 20 MHz primary channel. However, as already discussed, the NFRP trigger frame 700 may also be sent through an extended channel such as 40 MHz, 80 MHz or larger bands to extend the number of polled stations. By sending trigger frame 700, the AP reserves a transmission opportunity 760 (TXOP) corresponding to the duration specified inside the NFRP trigger frame.

If the NFRP trigger frame is sent over an overall width larger than the primary 20 MHz channel, the 802.11 ax standard envisages that the NFRP trigger frame is duplicated (replicated) on each other 20 MHz channels forming the targeted composite channel. Thanks to the duplication of control-type frames in non-HT format, it is expected that every nearby legacy node (non-HT or 802.11 ac nodes) receiving the NFRP trigger frame (or a duplicate thereof) on its primary channel, then sets its NAV to the value specified in the NFRP trigger frame. This prevents these legacy nodes from accessing the channels of the targeted composite channel during the TXOP.

Each non-AP STA receiving frame 700 is able to first analyze the received frame 700 to determine whether the non-AP STA is concerned with it, in particular to determine whether the non-AP STA is associated with the BSSID indicated in the TA field of the frame (or if the indicated BSSID pertains to a multiple BSSID set for which the non-AP STA is member of).

In case of positive determination, it then determines whether received frame 700 is a NFRP trigger frame, thanks to the type specified in Trigger Type field 820. These determinations form step S770 (FIG. 7*b*).

Next, the non-AP STA determines whether it is scheduled by the received NFRP trigger frame (step S772). It is made by checking whether its AID value (assigned to the non-AP STA by the AP upon registration to the AP) falls within the range ["Starting AID"; "Starting AID"+$N_{STA}$] as obtained from the fields UL BW 830, Starting AID 851 and Multiplexing flag 856 of the received NFRP trigger frame 700.

When the non-AP STA is not scheduled, nothing more happens at the station.

If it is scheduled by the NFRP trigger frame, the scheduled non-AP STA determines a RU tone set index, i.e. a RU tone set 710 on which the non-AP STA will transmit energy in response to the NFRP trigger frame. This is step S774. The non-AP STA usually selects a responding RU tone set based on the position of its AID within the above range, meaning the first RU tone set for the non-AP station having the Starting AID as own AID, and so on.

Table 27-30 of 802.11ax D4.1 describes an example of how the tones forming 80 MHz, 40 MHz, 20 MHz channels are grouped into sets of tones.

For instance, 216 tones (indexed from −113 to −6 and 6 to 113) forming a 20 MHz channel are split into six bundles 250 of 36 continuous tones. Next each RU tone set is formed by two tones from each bundle (usually consecutive tones that are collocated from one bundle to the other), thereby resulting in 18 RU tone sets, each having a unique index RU_TONE_SET_INDEX. The two tones obtained from each bundle are assigned to two respective groups forming the RU tone set. It means that each RU tone set is formed of two groups of tones 710*a* and 710*b*.

For illustrative purposes, the tone set with RU_TONE_SET_INDEX=6 in a 20 MHz channel without spatiality is made of the two following groups of tones (subcarrier indices):

Group 710*a*: −103, −67, −31, 16, 52, 88
Group 710*b*: −102, −66, −30, 17, 53, 89

In this example, 6 tones are replicated in each group over the 20 MHz channel, each tone from one of the six bundles of tones 750.

A RU tone set is thus made of two adjacent groups of tones (−103 is adjacent to −102, −67 to −66 and so on.), each group being made of non-adjacent tones (−103 not adjacent to −67 and so on.).

Basically, the tone set index for the scheduled non-AP STA is computed from the difference between STA's AID value and "Starting AID" value. For instance, if this difference plus 1 equals 6, the above-detailed tone set is scheduled for the non-AP STA considered.

Next at step S776, the non-AP STA generates the NDP feedback report response to be sent to the AP.

In particular, the non-AP STA has to transmit energy on the first group 710*a* of subcarriers or tones to indicate a first response to the feedback type (field 853) polled by the NFRP trigger frame 700, and on the other hand, the non-AP STA must transmit energy on the second group 710*b* of subcarriers or tones to indicate a second response to the feedback type.

The response is named FEEDBACK_STATUS in the current D4.1 version of 802.11 ax. For instance, for the Feedback Type field 853 set to 0 (Resource request), FEEDBACK_STATUS is set to 0 when the non-AP STA requests resource with buffered bytes for transmission between 1 and a resource request buffer threshold;
FEEDBACK_STATUS is set to 1 when the non-AP STA requests resource with buffered bytes for transmission above the resource request buffer threshold.

The non-AP station thus determines the NDP feedback report response to be sent depending on the feedback type field in the NFRP trigger frame.

Table 27-30 of 802.11 ax D4.1 specifies which group of tones within a tone set has to be used depending on the FEEDBACK_STATUS value.

At step S776, the non-AP STA thus determines the FEEDBACK_STATUS value and therefore the group of tones to be used, either 710*a* or 710*b*, depending on the feedback it wishes to report to the AP.

Next at step S778, the non-AP STA transmits energy of the group corresponding to the FEEDBACK_STATUS value in the RU tone set of the determined RU_TONE_SET_INDEX.

For illustration, Station 1 (corresponding to RU_TONE_SET_INDEX=1) transmits energy on its first group of tones 710*a* (as consequence, group 710*b* is represented with a dash line). On the contrary, Station 2 (corresponding to RU_TONE_SET_INDEX=1) transmits energy on its second group of tones 710*b*.

Technically, the HE TB NDP Feedback PPDU 711 used as a feedback response is a single packet with no real data payload as shown in FIG. 8*b*. The PHY preamble 712 is emitted on 20 MHz width (thus several non-AP STAs may emit the same preamble) and the 'payload' is composed of a series of HE-LTF symbols 713, located on the tones forming the selected group 710*a* or 710*b*, to be used for the transmitted feedback (energy).

Then, the physical layer of the AP receives and decodes (S762) the RU tone sets where energy is present, to provide to its MAC layer a list of used RU_TONE_SET_INDEX and the corresponding Feedback responses (FEEDBACK_STATUS values).

Thanks to the fields UL BW 830, Starting AID 851 and Multiplexing flag 856 of the NFRP trigger frame 700 sent at step S760, the AP is able to retrieve that AID of each non-AP STA responding to the trigger frame 700. The MAC layer entity of the AP is thus able to determine those NDP-scheduled non-AP STAs who have responded.

At step S764, the AP can send a subsequent trigger frame 720 (FIG. 7) to offer new opportunities (RUs) to the responding non-AP STAs, for example a 'Basic' type trigger frame or any convenient type. The 'Basic' type trigger frame is signaled by a "Trigger Type" subfield 820 having value 0.

Based on an AP's decision and the collected feedback responses 711, the trigger frame 720 may define a plurality of data resource units (RUs) 730 (here of 26 tones—of course other numbers of tones may be used). The multi-user feature of OFDMA allows the AP to assign different RUs to different non-AP STAs in order to increase competition. This helps to reduce contention and collisions inside 802.11 networks.

These RUs are scheduled RU assigned to the feedback-responding non-AP STAs, using the AIDs retrieved at step S764.

The trigger frame 720 may for instance include a plurality of User Info fields (FIG. 8a) for a respective plurality of scheduled RUs, each User Info field setting an AID (so-called AID12 field) of the scheduled non-AP STA for a given RU in the channel.

The non-AP STAs thus receive the subsequent trigger frame 720 and determine whether they are scheduled (step S780).

In the affirmative, the non-AP STA can use the RU scheduled to it (i.e. the one with the AID corresponding to the non-AP STA) and transmit data (HE TB PPDU) to the AP.

According to the exemplary illustration, Station 1 and Station 2 can thus be granted a RU 730. As an example, Station 1 emits a HE TB PPDU 731 in a first RU 730-1, and Station 2 emits a QoS_Null with Buffer Status Report (the HE TB PPDU is a MAC-PDU with no data payload but with a MAC header containing a BSR) in a second RU 730-2. As the Qos_Null is smaller, the second RU 730-2 is filled in with padding to match the transmission length specified in the trigger frame 720.

Upon receiving the HE TB PPDU 731, the AP acknowledges (or not) the data on each RU by sending a multi-STA block acknowledgment (BA) response (740—FIG. 7), making it possible for each sending non-AP STA to know when its data transmission is successful (reception of the ACK) or not (no ACK after expiry of a time-out). This is step S766.

Preferably, the AP sends a Multi-Station Block Acknowledgment 740 for the UL MU transmission 730, by using the AIDs of the non-AP stations having sent a HE TB PPDU 731. The format of Multi-Station Block Acknowledgment has been described above with reference to FIG. 5.

These explanations show the intent of the NFRP trigger frame mechanism according to the current version of the 802.11 ax standard: to receive feedbacks in a short time from a great number of associated non-AP stations.

The overall MU Uplink (UL) medium access sequence, including both NDP Feedback RUs and UL MU scheduled RUs, appears to be more efficient than conventional EDCA access scheme, especially in dense environments as envisaged by the 802.11 ax standard. This is because the number of collisions generated by simultaneous medium access attempts and the overhead due to the medium access are both reduced. The NFRP trigger frame 700 allows information to be requested from 18 non-AP stations per 20 MHz channel (more with spatial multiplexing), and the Basic trigger frame 720 allows RUs to be proposed to up to 9 stations which have shown their interest to be triggered (by responding to the NFRP trigger frame).

However, the Null-Data-Packet (NDP) Feedback Report procedure suffers from limitations, notably because only registered non-AP stations can be polled and because the number of triggered (scheduled) non-AP stations is limited to a fixed range of AIDs (from Starting AID 851) which may be punctured.

The inventors have thus contemplated providing random access to the RU tone sets of a NFRP trigger frame for the unassociated non-AP stations in order for them to early initiate, and at low time cost, scheduled RUs for those unassociated non-AP stations willing to register to the AP (i.e. to join the WLAN).

To this end, embodiments of the present invention provide a random access mechanism for short feedback procedure for unassociated non-AP stations. The AP may provide a NFRP trigger frame wherein a predefined AID value (e.g. in the Starting AID field 351) defines a random access for the unassociated non-AP stations to the plurality of RU tone sets. Consequence of the random access to the RU tone sets, the number of non-AP stations that can be targeted by the "random-access" (RA) NFRP trigger frame is no longer limited by the number of RU tone sets. In addition, the unassociated non-AP stations are now allowed to use the short feedback procedure to be known by the AP.

An unassociated non-AP station which determines that an association identifier, AID, field in the received RA-NFRP trigger frame includes a predefined AID value defining a random access for the unassociated non-AP stations to the plurality of RU tone sets, may then randomly select a responding RU tone set from the plurality of RU tone sets and send a NDP feedback report response on the selected responding RU tone set.

The unassociated non-AP station may contend for access to the corresponding subcarriers or tones or may compute a backoff value prior to selecting a RU tone set index, the backoff value being compared to an available range of RU tone sets provided by the RA-NFRP trigger frame for random access.

All the unassociated non-AP stations thus compete one each other to access the RU tone sets.

At its end, the AP can discriminate between unused RU tone sets and used RU tone sets, so that a subsequent trigger frame, for instance a basic one, is sent to provide new transmission opportunities (RUs) to responding unassociated non-AP stations. The overall scheme (random-based NDP feedback report procedure supplemented with a subsequent trigger frame) offers an efficient MU UL random scheme for the unassociated non-AP STAs because the random access is moved to the short NDP feedback report procedure compared to conventional UORA (with random RUs declared with AID=2045) that has a large duration. Indeed, one unused RU tone set has lower impact on network efficiency than one unused OFDMA RU (UORA).

Improved association procedures are now described with reference to FIGS. 9 to 10 which is initiated by such a random-based short feedback procedure available for unassociated non-AP stations willing to join the WLAN managed by the AP.

Although some of the proposed examples use the trigger frames 700 and 720 (see FIG. 7) sent by an AP for a multi-user (MU) uplink (UL) transmissions, equivalent mechanisms can be used in a centralized or in an ad hoc environment (i.e. without an AP). It means that the operations described below with reference to the AP may be performed by any station in an ad hoc environment. In particular, subsequent scheduling to provide scheduled transmission opportunities to the NFRP responding non-AP stations may be provided that is different from the 802.11ax UL MU operation.

Figure 9:
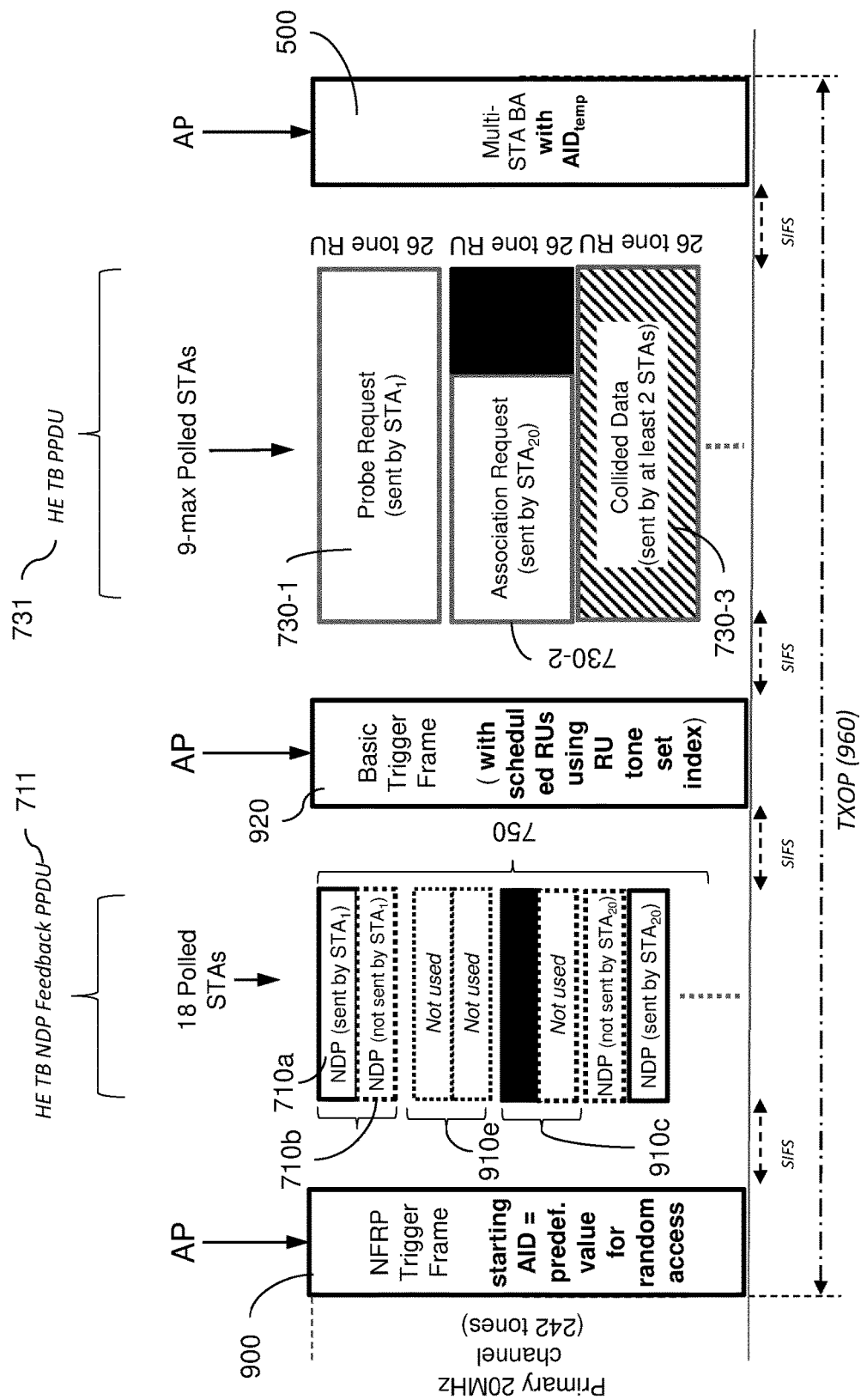
FIG. 9 illustrates, using the same scenario as FIG. 7, first embodiments of the invention providing random access to the RU tone sets during the NDP short feedback report procedure.

FIG. 9 uses the same timeline as FIG. 7. FIGS. 9a and 9b illustrate, using flowcharts, corresponding general steps at the AP and an unassociated non-AP STA, respectively. The reference numbers are unchanged when referring to the same elements, frames and steps as in FIG. 7.

At step S960, the AP 110 polls a large group of unassociated non-AP STAs to know their needs, by sending RA-NFRP trigger frame 900 wherein the Starting AID field 851 is set to a predefined AID value, e.g. predefined AID value=2045, defining a random access for the unassociated non-AP stations to the plurality of RU tone sets. This sharply contrasts with the "Starting AID" field conventionally used which defines the first AID of a restricted range of AIDs corresponding to registered non-AP stations scheduled to respond to the RA-NFRP Trigger frame.

Thanks to this specific predefined value, the AP can offer a short (i.e. at low time cost) opportunity for the unassociated non-AP STAs willing to join the WLAN to be known by the AP, with a view of having their registration/association process speeded up by providing subsequent RUs as described below.

At step S770, any non-AP station 101-107 receives the RA-NFRP Trigger frame 900 and decodes it. If the receiving non-AP station belongs to a BSS (or virtual BSS) of the transmitting AP or is not yet associated but desires to join the WLAN, the Trigger Frame is not filtered by the PHY layer as defined in the standard. The filtering is made on so-called "colors" defined in the 802.11 ax standard, which mandates that the BSS colors of all the multiple BSSs managed by a single AP are the same.

At step S972, an unassociated non-AP STA determines whether the received RA-NFRP Trigger frame defines a random access NFRP feedback procedure for unassociated non-AP STAs. Indeed, other RA-NFRP Trigger frame may provide a random access NFRP feedback procedure for yet associated non-AP stations for instance. This is made by checking the value of the Starting AID field 851 which may be equal to the predefined AID value, e.g. 2045.

At the end of step S972, the unassociated non-AP STA knows whether it is allowed to respond to the received RA-NFRP trigger frame 900. In the affirmative, the unassociated non-AP STA determines whether it has interest in responding (test S973), e.g. because it desires to join the WLAN of the AP. In the affirmative, the process goes on at step S974.

At step S974, the unassociated non-AP STA determines a random RU tone set 710 to send its short NDP feedback report response 711. The selection of the RU tone set is made on a random basis by selecting an index from among the available indexes. All the RU tone sets are available for contention. Optionally, only the RU tone sets that fit into station capabilities are eligible for contention (e.g. a station operating on a limited band BW such as a 20 MHz-only station).

The number of RU tone set indexes ($N_{MAX\_SET}$) may be determined based on the following formula as above: $N_{MAX\_SET}=N_{feedback} \times 2^{BW} \times (\text{MultiplexingFlag}+1)$. As currently defined in 802.11ax D4.1, $N_{feedback}=18$.

The unassociated non-AP STA may then randomly select a random RU tone set index (RA_NFRP_SET_INDEX) to send its short feedback:

RA_NFRP_SET_INDEX=random [0, $N_{MAX\_SET}-1$]. Here, it is chosen to start the indexes at 0. In variant, the first index may have another value, e.g. 1 or above, and the provided formulae are modified accordingly.

In other embodiments, randomly selecting a responding RU tone set is based on a contention-based access method using a decrementing NFRP backoff, NBO, counter local to the unassociated non-AP station. The NBO is handled using NFRP Random Access contention parameters including a NFRP contention window.

In this random access procedure for association, the unassociated non-AP STA may still indicate different responses to the feedback type (field 853) polled by the RA-NFRP trigger frame 900, depending on the group of tones used within the selected random RU tone set: for example, transmitting on the first group of RU tones 710a may indicate a FEEDBACK_STATUS equal to 0, and transmitting on the second group of RU tones 710b may indicate a FEEDBACK_STATUS equal to 1. In that case, the NDP feedback report response is transmitted on one of the two groups of tones.

In a variant where the polled unassociated non-AP STA have no choice in the response (this may be defined by a specific Feedback type in field 853), each group defined above (710a or 710b) may be considered as a separate random RU tone set available for contention by the polled unassociated non-AP STAs. In that case, a RU tone set is made of a single group of non-adjacent tones.

This adds additional tone sets for Random selection: for instance, the number of available RU tone sets is double (36 indexes instead of 18 for a 20 MHz channel without spatial multiplexing). Consequently, less collisions statistically happen in the RU tone sets, thereby improving the usage of HE TB PPDU 731.

Once the random RU tone set (RA_NFRP_SET_INDEX) has been randomly selected at step S974, the unassociated non-AP STA determines the FEEDBACK_STATUS value, if any at step S776. An exemplary embodiment where the FEEDBACK_STATUS value is important for the AP in order to efficiently provide subsequent MU UL opportunities is described below with reference to FIG. 10.

The unassociated non-AP STA then transmits the NDP Feedback Report response 711 using the appropriate group of tones in the selected random RU tone set (step S778): for instance, Station 1 transmits energy (NDP) on the first group 710a of the selected RU tone set as illustrated in FIG. 9.

The unassociated non-AP STA transmits the header 712 of TB Feedback PPDU 711 on the 20 MHz channel corresponding to the selected RA_NFRP_SET_INDEX, and transmits on each of the subcarrier indexes forming the group for the FEEDBACK_STATUS value, the value of the HE-LTF sequence 713.

As become apparent in FIG. 9, due to the random selection, some RU tone sets may be not randomly selected, so that the corresponding tone groups 710a and 710b are left unused. Such situation is shown by reference 910e in the Figure.

Also, the random selection of RA_NFRP_SET_INDEX may result in having two or more unassociated non-AP STAs selecting the same RU tone set. Such situation is shown by reference 910c in the Figure.

Anyway, the AP receives and decodes (S762) the RU tone sets where energy is present, to provide to its MAC layer a list of used RU_TONE_SET_INDEX and the corresponding Feedback responses (FEEDBACK_STATUS values) if any. At this stage, it is not possible for the AP to know which RU tone sets with energy are collided (910c) or not.

At step S964, the AP can send a subsequent trigger frame 920 to offer new opportunities (RUs) to the responding unassociated non-AP STAs, for example a 'Basic' type trigger frame or any convenient type. Preferably, the scheduled RUs are of narrow width (26 tones) to offer a maximum of nine RUs per 20 MHz channel. The AP may choose a subset of the responding unassociated non-AP STAs.

However, at this stage, it is impossible for the AP to schedule the responding unassociated non-AP STAs using AIDs in the trigger frame 920 because unassociated non-AP STAs have no AIDs and in addition the AP does not know which unassociated non-AP STAs have emit energy on a given RU tone set 910.

Consequently, in an innovative way, the AP assigns a scheduled resource unit to a responding unassociated non-AP station using the index RU_TONE_SET_INDEX of the corresponding responding RU tone set to define the AID (so-called AID12 field in the trigger frame) associated with the scheduled RU.

The AP may directly use the index RU_TONE_SET_INDEX as value for the AID12 field.

However, in order to avoid these scheduled index-based AIDs (for unassociated non-AP stations) to fall on conventionally-used AIDs (for BSS or for individual non-AP STAs, typically values from 1 to 2007 and some values below 2048 such as 2045 and 2046, and value 4095 is reserved to indicate start of a Padding field), the AID associated with the scheduled resource unit in the subsequent trigger frame may be built from the index RU_TONE_SET_INDEX of the responding RU tone set and from an offset value Offset_AID.

For instance, the AID12 field of a User Info field defining the scheduled RU may be set to RA_NDP_AID:

$$RA\_NDP\_AID = Offset\_AID + RA\_NFRP\_SET\_INDEX + STARTING\_STS\_NUM \times N_{feedback} \times 2^{BW}$$

where
RA_NFRP_SET_INDEX is a selected one from the indexes of the responding RU tone sets used by the responding unassociated non-AP STA,
STARTING_STS_NUM is parameter handling the spatial multiplexing. It is a station parameter that corresponds to a starting spatial stream number minus 1. It is set to 0 if the MultiplexingFlag 856 of the RA-NFRP trigger frame 900 is set to 0 (no spatial multiplexing), otherwise it is set as follows:

STARTING_STS_NUM=entire value(RA_NFRP_SET_INDEX/$N_{feedback}/2^{BW}$)

The Offset_AID parameter is a predetermined offset value known by the unassociated non-AP STAs and the AP. In some embodiments, the Offset_AID parameter is transmitted by the AP to the stations in a management frame, e.g. periodically in beacon frames.

Preferably, the Offset_AID parameter is selected such that any subsequent RA_NDP_AID falls outside the legacy range of Association Identifiers (AIDs) provided by AP to associated non-AP STAs. For instance, the offset value is 2048 or above. It is then added to the index RA_NFRP_SET_INDEX of the responding RU tone set to form the AID (AID12 field) associated with the scheduled resource unit.

Using an offset value of 2048 to form the 12-bit AID field makes it possible to work on the MSB (set to 1) to easily distinguish between conventional AIDs (including AID=2045) and those used for the present invention. Furthermore, it allows scheduled RUs for unassociated non-AP STAs responding to the RA-NFRP trigger frame 900 to be mixed with scheduled RUs for other non-AP stations directly per their own AID value, with no risk of misunderstanding and/or with random RUs for yet-associated non-AP stations (AID=0) and/or unassociated non-AP stations (AID=2045).

In case of mixing random RUs for unassociated non-AP stations (AID=2045) and scheduled RUs based on the RA_NFRP_SET_INDEX, the subsequent trigger frame 920 first declares all the resource units (it may be a single one) assigned to responding unassociated non-AP stations using indexes RA_NFRP_SET_INDEX of the responding RU tone sets (preferably using RA_NDP_AID) and then declares all the random resource units (may be a single one) reserved for unassociated non-AP stations to which the unassociated non-AP stations access based on contention.

Of course, the subsequent trigger frame 920 may only comprise resource units for non-AP stations responding to the RA-NFRP trigger frame 900 (i.e. RUs with only AID12 set based on RA_NDP_AID).

In all case, the subsequent trigger frame may only comprise scheduled resource units (assigned to respective individual non-AP stations) without random RUs.

At step S964, the AP 110 thus sends the subsequent basic trigger frame 920 so built.

Any unassociated non-AP STA receiving the subsequent trigger frame 920 thus determines (step S980) whether it is scheduled, i.e. whether a resource unit is assigned to the unassociated non-AP station based on the index RA_NFRP_SET_INDEX of the responding RU tone set determined and used by the unassociated non-AP station at steps S974 and S778.

The unassociated non-AP STA having responded to the RA-NFRP trigger frame 900 uses the formula above to determine its own RA_NDP_AID and compares it to the AID12 fields specified in the User Info fields of the subsequent trigger frame 920. The unassociated non-AP STA thus determines whether an AID associated with a scheduled resource unit in the subsequent trigger frame corresponds to the index RA_NFRP_SET_INDEX used given the predefined offset value Offset_AID.

In a preferred embodiment where Offset_AID is set to value 2048, all RUs with MSB set to 1 are analyzed in order than the remaining value (not considering the MSB bit) equals to the RU tone set index RA_NFRP_SET_INDEX the unassociated non-AP station has previously used.

Of course, in case of mixing RA_NFRP_SET_INDEX-based RUs with random RUs for unassociated non-AP stations (AID=2045), the unassociated non-AP station may have the choice to select two RUs, in which case it should give priority to the scheduled RA_NFRP_SET_INDEX-based RU to let the random RU to any other unassociated non-AP STA. In other words, the unassociated non-AP station may determine whether the trigger frame 920 provides a random RU reserved for unassociated non-AP stations to which the unassociated non-AP stations access based on contention, determine whether the trigger frame 920 provides a RU with an associated AID corresponding to an index of a responding RU tone set previously used by the unassociated non-AP station to send a NDP feedback report response to the AP, and if both determining steps are positive, it selects (for MU UL transmission) the RU with the associated AID corresponding to the index of the responding RU tone set.

The unassociated non-AP station may thus first determine whether one Resource Unit is allocated to it in case that the unassociated non-AP station has previously sent a NDP feedback response 711 in response to the random-access NFRP trigger frame 900. The determination relies on the formula for determining RA_NDP_AID value, considering the RU tone index RA_NFRP_SET_INDEX used for the NDP Feedback report response and the predetermined offset value (Offset_AID).

In case of positive determination at step S980, the unassociated non-AP STA can use the RU scheduled to it and transmit data 731 (HE TB PPDU) to the AP. This is step S782. The HE TB PPDU 731 contains the MAC address of the sending unassociated non-AP station, making it possible for the AP to identify each sending unassociated non-AP station.

As the RA-NFRP trigger frame 900 is targeting non-associated stations, the unassociated non-AP station may emit at least one association management frame, such as a Probe Request or (Re)Association Request or Authentication Request. This is because it intends to register with the AP. It turns that the association procedure is substantially speeded up compared to conventional techniques.

This approach is illustrated in FIG. 9 where:
unassociated Station 1 has randomly picked up a RU tone set index having value 0 (NDP feedback emitted on the first tone set), then it is allocated a scheduled RU 730-1 with RA_NDP_AID=2048. Station 1 then sends a Probe Request frame 150;
unassociated Station 20 has randomly picked up a RU tone set index having value 3 (NDP feedback emitted on 4th tone set), then it is allocated a scheduled RU 730-2 with RA_NDP_AID=2051. Station 20 then sends an Association Request frame 170;
at least two unassociated stations have randomly picked up the same RU tone set index having value 2 (NDP feedback emitted on the third tone set corresponding to 910c), then they are allocated the same RU 730-3 because they use the same RA_NDP_AID=2050. As a result, the at least two unassociated non-AP stations collide in the RU 730-3.

The AP 110 thus receives the HE TB Data PPDU 731 over the multiple scheduled RUs. It can then acknowledge (or not) the data received on each RU by sending (S966) a multi-STA block acknowledgment (BA) response 500 according to the invention, making it possible for each sending unassociated non-AP STA to know whether its data transmission has been successful (reception of the ACK) or not (no ACK after expiry of a time-out) but also to receive (S984) a temporary AID to be used for subsequent exchanges with the AP.

For instance, the AP may not acknowledge data over RU 730-3 (FIG. 9) as it detects a collision.

The AP obtains the MAC address of the sending unassociated non-AP station from the MAC header of the MPDU composing each received HE TB Data PPDU 731. The AP can thus determine if a new MAC address is found that is not currently associated with a temporary AID. This may be done by merely searching in a local table storing the current pairs of {$AID_{temp}$, MAC address}. For each new unassociated non-AP station (i.e. its MAC address is unknown), a temporary AID may be allocated (limited in duration as mentioned above).

For non-yet-associated non-AP stations having responded to the RA-NFRP trigger frame 900, the AP still uses the MAC addresses of the sending non-AP stations in the acknowledgment frame (in subfield RA 535) because no AID is available for these unassociated non-AP stations. This corresponds to the Pre-association ack context according to the 802.11 ax standard, which acknowledges pre-association Management frames for multiple STAs using a single Multi-STA BlockAck frame. In addition, as mentioned above, the MAC address (field 535) is associated with the temporary AID (field 534-2) in the Multi-STA BA 500. This corresponds to temporary AIDs delivery to unassociated non-AP stations according to the invention.

In the example of the Figure, Multi-STA BA frame 500 may contain one "Per AID TID Info" 530c addressed to unassociated Station 1 (with a new $AID_{temp}$ selected by module 305a) and another "Per AID TID Info" 530c addressed to unassociated Station 20 (with a new $AID_{temp}$ selected by module 305a).

The unassociated non-AP station then retrieves its $AID_{temp}$ from the Multi-STA BA frame 500. From this time point and as long as the $AID_{temp}$ is valid, new trigger frames (not shown) may be sent by the AP, including a RU scheduled to the unassociated non-AP station (using $AID_{temp}$ in AID12 subfield). The unassociated non-AP station is thus offered new AP-triggered opportunities to send data, although it is not yet associated.

The example of FIG. 9 shows a single TXOP 960 during which the NDP Feedback Report procedure and subsequent UL MU operation are both conducted. This ensures that the feedback responses 711 are still relevant when they are exploited by the AP to provide the subsequent UL MU operation based on these responses. In addition, it advantageously avoids a random tone set index to be kept by a non-AP station outside the TXOP; otherwise, this would require keeping in memory this random index for further usage by Data trigger frame TF 920 or until a next RA-NFRP trigger frame 900.

However, TXOP 960 may be split into two separate TXOPs, and/or alternatively several subsequent trigger frames 920 (possibly cascaded) may be issued in order to address more non-AP stations responding to the NFRP trigger frame 900 (as only 9 maximum stations per 20 Mhz can be triggered for data RU transmission per Basic trigger frame).

The proposed random access scheme provides good efficiency: the collision is largely performed on the NDP feedback responses 711 which are shorter in duration, and the RUs used for HE TB PPDU 731 are never empty.

The best theoretical probabilities for classical random access distributions (such as slotted ALOHA—type) are the following: probability of no collision (success) nearly 37%, compared to 37% for empty, and 26% collisions. This offers a theoretical efficiency ratio of 37% for UORA for instance.

The proposed implementation substantially improves this situation as the random access is moved to the short time NDP Feedback report procedure. It turns that no random RUs (and thus no empty RUs) are met in the subsequent UL MU operation (triggered by trigger frame 920).

Applying a random selection among 18 RU tone set index during the NDP Feedback report procedure provides approximately 6.66 (6) success indexes in addition to 4.68 (4) collisions (for a total of 10 full occupied indexes). As a result, it is expected that most of these occupied slots could be later scheduled in the HE TB PPDU (there is no scheduling for empty RU indexes).

Finally, on average, the maximum efficiency for the MU UL transmission using 9 RUs would be: 37/(37+26)=58.7% as there are no longer empty RUs. This is a high improvement compared to the conventional 37% of the UORA scheme.

Finally, the NDP Feedback Report procedure 900/711 and subsequent UL MU operation 920/731 result in allocating (temporary) AIDs to not yet associated non-AP stations, without any overhead in message exchanges.

The newly allocated (temporary) AID can further be used to support management frames exchange over MU transmissions with the AP (that is to say both UL or DL MU operations).

In the above example, the unassociated non-AP stations provide NDP feedback report responses 711 using any FEEDBACK_STATUS value. In other examples, now described, the returned FEEDBACK_STATUS value may be meaningful for the AP in order to efficiently schedule some unassociated non-AP stations during the MU UL operation 920/731. For instance, a FEEDBACK_STATUS value equal to 1 may mean the responding unassociated non-AP station is willing to register and then scheduled RUs in subsequent MU UL operations will speed up the association procedure: a temporary AID should be provided; while a FEEDBACK_STATUS value equal to 0 may mean the responding unassociated non-AP station does not desire to register and then it is not worth providing it with scheduled RUs in subsequent MU UL operations: no temporary AID is thus required.

Figure 10:
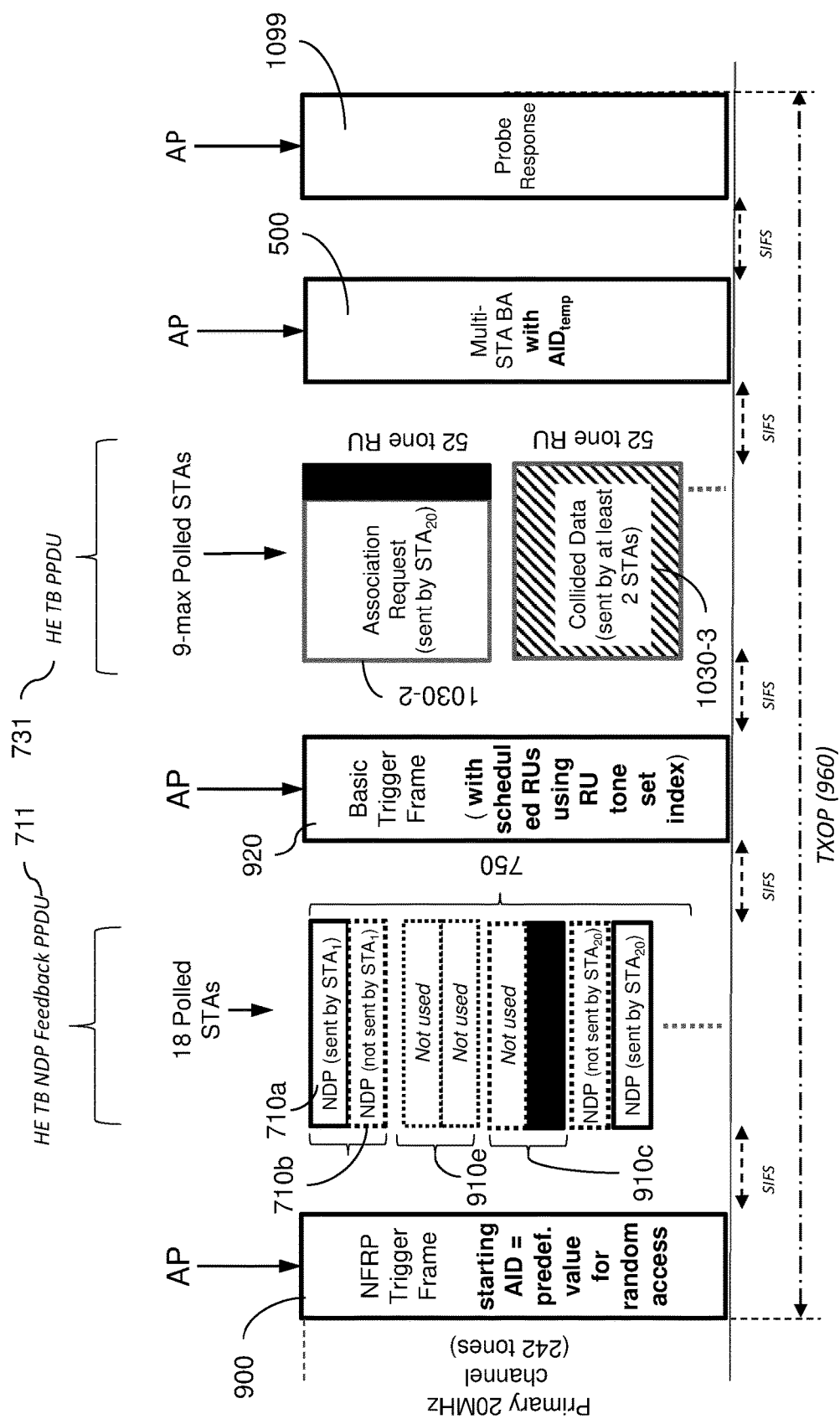
FIG. 10 illustrates, using the same timeline as FIGS. 7 and 9, second embodiments of the invention.

FIG. 10 uses the same timeline as FIGS. 7 and 9. The reference numbers are unchanged when referring to the same elements, frames and steps as in FIGS. 7 and 9.

The scenario of the Figure is association-oriented but could apply to other situations.

Some unassociated non-AP stations may want to receive general information (supported rates and 802.111 capabilities) on the WLAN without intend to associate (e.g. they want to have an up-to-date view of the WLANs) while other unassociated non-AP stations may desire to associate with the AP. The Feedback Type field 853 of the RA-NFRP trigger frame 900 is thus set accordingly: to a value indicating to the unassociated non-AP stations they have to respond to either of the two options.

In the present example:
unassociated Station 1 has randomly picked up a RU tone set index having value 0 (NDP feedback emitted on the first tone set). It sends, on the RU tone set, a NDP feedback report response 711 of a type indicating it only wishes to receive information on the WLAN. No temporary AID is required. This response may be considered as a Probe Request to discover 802.11 networks in station's vicinity, although it has not the same format. For instance, the NDP feedback report response 711 of that type is FEEDBACK_STATUS equal to 0 (energy sent on the first group of tones 710a);
unassociated Station 20 has randomly picked up a RU tone set index having value 3 (NDP feedback emitted on 4th tone set). It sends, on the RU tone set, a NDP feedback report response 711 of a type indicating the unassociated non-AP station has a frame to send to the AP, and thus is willing to obtain a temporary AID to gain MU UL opportunities for subsequent transmission. The NDP feedback report response 711 of that type is FEEDBACK_STATUS equal to 1 (energy sent on the second group of tones);
at least two unassociated non-AP stations have randomly picked up the same RU tone set index having value 2 (NDP feedback emitted on the third tone set corresponding to 910c).

The AP discovering those RU tone sets where FEEDBACK_STATUS=0, understands that some unassociated non-AP stations are requesting a Probe Response 152 without temporary AIDs. Consequently, no RU in trigger frame 920 is allocated to unassociated Station 1 having responding it only wishes a Probe Response frame to be sent. This is different from FIG. 9 where an RU 730-1 has been provided to send a Probe Request.

The AP discovering those RU tone sets where FEEDBACK_STATUS=1, understands that some unassociated non-AP stations are willing to associate, requesting temporary AIDs and scheduled RUs to transmit their management frames. Consequently, unassociated Station 20 is allocated a scheduled RU 1030-2 with RA_NDP_AID=2051. Station 20 can send an Association Request frame 170;
the two unassociated non-AP stations emitting on the third tone set are allocated the same RU 1030-3 because they use the same RA_NDP_AID=2050. As a result, they collide in the RU 1030-3.

In one embodiment, an unassociated non-AP station that has already obtained a temporary AID by performing a first MU UL operation sequence 900/711/920/731/500 as depicted in FIG. 10, may abstain from requesting any further request of temporary AID in any subsequent sequence, i.e. to respond with a FEEDBACK_STATUS=1 in subsequent short feedback procedures.

The abstention may lapse with the temporary AID lifetime, allowing the unassociated non-AP station to request a new temporary AID when the previous one has expired.

In a preferred variant, an unassociated non-AP station may apply to the provided sequence several times (with FEEDBACK_STATUS=1), but the AP will only allocate a temporary AID to the unassociated non-AP station once (at the first request time). In other words, the AP will provide back to the unassociated non-AP station the same temporary AID during its lifetime. This advantageously allows an unassociated non-AP station to take benefit of the RA-NFRP scheme for sending a subsequent management frame, in case of no Basic TF with an RU scheduled for the temporary AID is yet emitted by the AP (this is because the AP does not know when the non-AP station is ready to advance in its association procedure).

Equating the FEEDBACK_STATUS=0 to a Probe Request is extremely advantageous as it substantially reduces the usage of the RUs 730 for some management frames. Indeed, as Probe request frames are numerous in dense networks and are transmitted in SU mode, they are flooding the wireless resources. In addition, more bandwidth is let to other RUs of the MU UL operation 920/731, due to the reduced number of unassociated non-AP stations having responded with a need for RU and temporary AID. This allows having shorter RUs for the same amount of transmitted data. In the present case, RUs 1030-2 and 1030-3 can be shorter 52-tone-wide RUs instead of longer 26-tone-wide RUs.

At the end of the MU UL operation 920/731, the AP sends the Multi-STA BA frame 500 with the temporary AIDs for the appropriate unassociated non-AP stations, i.e. those having responded FEEDBACK_STATUS=1.

In addition, the AP sends a broadcast Probe Response frame 1099 if at least one of the received NDP feedback report responses 711 is FEEDBACK_STATUS=0, which is the case in the example. Probe response 1099 is sent to inform the stations on the SSID (wireless network name), supported data rates, encryption types if required, and other 802.11 capabilities of the AP.

The Probe Response 1099 is intended for all the unassociated non-AP stations having responded FEEDBACK_STATUS=0. Consequently, the MAC address used for the management frame is set to a broadcast MAC address.

Probe Response frame 1099 may be carried in the SU mode or in the MU mode where a DL PPDU embeds a broadcast RU (with a signalling AID subfield, STA-ID, set to value 2045).

When the Multi-STA BA frame 500 and the Probe Response frame 1099 are separate, the unassociated non-AP stations only process one of them: either the unassociated non-AP station is concerned with the Multi-STA BA frame 500 (it is involved in a RU 1030 and then waits for its acknowledgment and temporary AID) and then it disregards the Probe Response 1099, or the unassociated non-AP station is not concerned with the Multi-STA BA frame 500 (it is not involved in a RU 1030 or it has responded FEEDBACK_STATUS=0) and then it reads the Probe Response 1099. In other words, as soon as a non-AP station has received an AID (even temporary), it disregards any following broadcast RU with an AID subfield (STA-ID) equal to 2045 of a DL MU PPDU.

Alternatively, the Multi-STA BA frame 500 and the Probe Response frame 1099 may be aggregated in the same DL MU PPDU, within a common broadcast RU with an AID subfield (STA-ID) equal to 2045. This approach advantageously avoids an interframe space (SIFS) to be provisioned between the two frames.

The Probe Response information embedded in the Probe Response MPDU 1099 may be larger than legacy Probe Response information (because legacy format is intended to a single unassociated non-AP station, where only common supported elements may be provided). Nevertheless, a single MPDU even larger as in the proposed scheme advantageously uses less wireless resources than several individual MPDU frames as done in conventional techniques.

Although the present invention has been described herein above with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular, the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a wireless network managed by an access point (AP), comprising the following steps at an unassociated station:
    receiving, from the AP, a previous trigger frame reserving a plurality of resource units (RUs), for uplink multi-user (UL MU), transmissions to the AP;
    selecting a first one of the RUs;
    transmitting a first frame to the AP on the selected first RU; and
    receiving, from the AP, an acknowledgment frame acknowledging the sent first frame, wherein the acknowledgment frame is a multi-station block acknowledgment frame providing a temporary association identifier (AID) to the unassociated station and including a medium access control (MAC) address of the unassociated station for which the temporary AID is intended,
    wherein the selected first RU is an RU provided in the previous trigger frame with an associated AID corresponding to an index of a responding RU tone set previously used by the unassociated station to send a null data packet (NDP) feedback report response to the AP.

2. The communication method of claim 1, further comprising, at the unassociated station:
    receiving, from the AP, a subsequent trigger frame, ensuing the receipt of the acknowledgement frame, reserving a plurality of resource units, RUs, including a second RU, for uplink multi-user, UL MU, transmissions to the AP, wherein the second RU is assigned to the unassociated station using the temporary AID.

3. The communication method of claim 2, further comprising, at the unassociated station:
    sending a subsequent association management frame to the AP, ensuing the subsequent trigger frame, over the second RU assigned to the unassociated station using the temporary AID, and
    receiving a definitive AID from the AP in response to the subsequent association management frame.

4. The communication method of claim 3, wherein the definitive AID is the temporary AID.

5. The communication method of claim 2, further comprising, at the unassociated station:
    receiving, from the AP, a random-access (RA), null data packet (NDP), feedback report poll (NFRP), trigger frame, the RA-NFRP trigger frame reserving a plurality of resource unit, RU, tone sets for NDP feedback report responses by unassociated stations, wherein the RU tone sets are accessed by the unassociated stations on a random basis,
    randomly selecting a responding RU tone set from the plurality of RU tone sets, and
    sending the NDP feedback report response on the selected responding RU tone set.

6. The communication method of claim 5, wherein the unassociated station sends a NDP feedback report response of a first type to indicate the unassociated station has the first frame to send to the AP.

7. The communication method of claim 1, wherein selecting the first RU comprises:
    determining whether the previous trigger frame provides a random RU reserved for unassociated stations to which the unassociated stations access based on contention, and
    determining whether the previous trigger frame provides a RU with the associated AID corresponding to the index of the responding RU tone set previously used by the unassociated station to send the NDP feedback report response to the AP, and
    if both determining steps are positive, selecting, as first RU, the RU with the associated AID corresponding to the index of the responding RU tone set.

8. The communication method of claim 1, wherein the first RU is a random RU for unassociated stations to which the unassociated stations access based on contention.

9. The communication method of claim 1, further comprising releasing the temporary AID for the unassociated station upon detecting a temporary AID releasing event, the temporary AID releasing event being one event from:

a provision of a definitive AID by the AP to the unassociated station upon completion of an association procedure of the unassociated station to the AP, a failure in an association procedure of the unassociated station to the AP, and an expiry of a predefined temporary AID lifetime timer.

10. The communication method of claim 1, wherein the first frame is a management frame, for instance an association management frame to register the unassociated station to the AP.

11. The communication method of claim 1, wherein the temporary AID is associated with a MAC address of the unassociated station, within the multi-station block acknowledgment.

12. The communication method of claim 1, wherein the temporary AID is 2-bytes long and is stored in a 4-bytes long Reserved subfield of a block acknowledgment (BA) Information field of a multi-station block acknowledgment frame as defined in IEEE 802.11ax.

13. A communication device comprising at least one microprocessor configured for carrying out the steps of the communication method of claim 1.

14. The communication method of claim 1, wherein the acknowledgment frame is a multi-station block acknowledgment (Multi_STA BA), frame, according to 802.11 standard series, that contains at least one information subfield providing the temporary AID to the unassociated station,
wherein the information subfield contains a first AID identifier field to indicate that the information contained in the information subfield is to be used only by unassociated stations, a MAC address field to indicate the MAC address of the unassociated station to which the information subfield belongs, and a second AID identifier field used to provide the temporary AID to the unassociated station as identified by the MAC address field.

15. A communication method comprising the following steps at an access point, AP, managing a wireless network:
sending a previous trigger frame reserving a plurality of resource units, RUs, for uplink multi-user, UL MU, transmissions from stations;
receiving a first frame from at least one unassociated station, on a first RU of the plurality of RUs for UL MU transmissions;
obtaining a temporary association identifier, AID, for the unassociated station; and
sending an acknowledgment frame to acknowledge the received first frame to the unassociated station, wherein the acknowledgment frame is a multi-station block acknowledgment frame providing the temporary AID to the unassociated station and including a MAC address of the unassociated station for which the temporary AID is intended,
wherein the first RU is an RU provided in the previous trigger frame with an associated AID corresponding to an index of a responding RU tone set previously used by the unassociated station to send a NDP feedback report response to the AP.

16. The communication method of claim 15, further comprising, at the AP, sending a subsequent trigger frame, ensuing the receipt of the acknowledgement frame, reserving a plurality of resource units (RUs), including a second RU, for uplink multi-user, UL MU, transmissions from stations, wherein the second RU is assigned to the unassociated station using the temporary AID.

17. The communication method of claim 16, further comprising, at the AP, receiving a subsequent association management frame, ensuing the subsequent trigger frame, from the unassociated station over the second RU assigned to the unassociated station using the temporary AID, and
providing a definitive AID to the unassociated station in response to the subsequent association management frame.

18. The communication method of claim 17, wherein the definitive AID is the temporary AID.

19. The communication method of claim 15, wherein the first RU is a random RU for unassociated stations to which the unassociated stations access based on contention.

20. The communication method of claim 15, further comprising, at the AP, sending a random-access, RA, null data packet, NDP, feedback report poll, NFRP, trigger frame, the RA-NFRP trigger frame reserving a plurality of RU tone sets for NDP feedback report responses by unassociated stations, wherein the RU tone sets are accessed by the unassociated stations on a random basis, and
receiving, from responding unassociated stations, NDP feedback report responses on responding RU tone sets.

21. The communication method of claim 20, wherein the first RU is a RU assigned to a responding unassociated station that has responded a NDP feedback report response of a first type, and further comprising, at the AP, sending a broadcast Probe Response frame if at least one of the received NDP feedback report responses is a NDP feedback report response of a second type.

22. The communication method of claim 15, wherein the previous trigger frame defines resources units specifically assigned to respective unassociated non-AP stations using indexes of corresponding responding tone sets and defines random resource units accessible through contention by the unassociated non-AP stations,
wherein the previous trigger frame first declares all the resource units assigned to responding unassociated non-AP stations next declares all the random resource units.

23. A communication device comprising at least one microprocessor configured for carrying out the steps of the communication method of claim 8.

24. The communication method of claim 15, wherein the acknowledgment frame is a multi-station block acknowledgment (Multi_STA BA), frame, according to 802.11 standard series, that contains at least one information subfield providing the temporary AID to the unassociated station,
wherein the information subfield contains a first AID identifier field to indicate that the information contained in the information subfield is to be used only by unassociated stations, a MAC address field to indicate the MAC address of the unassociated station to which the information subfield belongs, and a second AID identifier field used to provide the temporary AID to the unassociated station as identified by the MAC address field.

* * * * *